US011063881B1

(12) United States Patent
Vijayasuganthan et al.

(10) Patent No.: US 11,063,881 B1
(45) Date of Patent: Jul. 13, 2021

(54) METHODS AND APPARATUS FOR NETWORK DELAY AND DISTANCE ESTIMATION, COMPUTING RESOURCE SELECTION, AND RELATED TECHNIQUES

(71) Applicant: Swarmio Inc., Sydney (CA)

(72) Inventors: Karthigesu Vijayasuganthan, Ontario (CA); Sorin Stoian, Ontario (CA); Shervin Shirmohammadi, Ottawa (CA); Shady Mohammed, Ontario (CA); Alaa Eddin Alchalabi, Ontario (CA)

(73) Assignee: Swarmio Inc., Sydney (CA)

( * ) Notice: Subject to any disclaimer, the term of this patent is extended or adjusted under 35 U.S.C. 154(b) by 0 days.

(21) Appl. No.: 17/087,442

(22) Filed: Nov. 2, 2020

(51) Int. Cl.
*H04L 12/923* (2013.01)
*H04L 12/911* (2013.01)
(Continued)

(52) U.S. Cl.
CPC .......... *H04L 47/762* (2013.01); *G06K 9/6256* (2013.01); *G06K 9/6262* (2013.01);
(Continued)

(58) Field of Classification Search
CPC ... H04L 47/762; H04L 47/748; H04L 47/781; H04L 41/147; H04L 12/1485;
(Continued)

(56) References Cited

U.S. PATENT DOCUMENTS

2008/0083040 A1\* 4/2008 Dani ..................... H04L 9/3271
726/28
2013/0346614 A1\* 12/2013 Baughman ............ G06F 9/5083
709/226

(Continued)

OTHER PUBLICATIONS

[No Author Listed], Feature Crosses. Google Developers. Feb. 10, 2020:14 pages. https://developers.google.com/machine-learning/crash-course/feature-crosses/video-lecture [last accessed Jan. 22, 2021].

(Continued)

*Primary Examiner* — Ninos Donabed
(74) *Attorney, Agent, or Firm* — Wolf, Greenfield & Sacks, P.C.

(57) ABSTRACT

The techniques described herein relate to methods, apparatus, and computer readable media configured to select a computing resource from a plurality of computing resources to perform a computing process. A request is received from a remote computing device to perform the computing process. A first set of estimated metrics is accessed that includes an estimated metric for each computing resource and the first remote computing device. The second data is processed using a machine learning algorithm to select a candidate computing resource to perform the process. The machine learning algorithm selects the candidate computing resource based on a second estimated metric between at least one second remote computing device and an associated computing resource from the plurality of computing resources performing a second computing process for the at least one second remote computing device, and a capacity of each computing resource of the plurality of computing resources.

17 Claims, 23 Drawing Sheets

(51) Int. Cl.
*G06N 3/08* (2006.01)
*G06K 9/62* (2006.01)
*G06N 20/00* (2019.01)

(52) U.S. Cl.
CPC .............. *G06N 3/08* (2013.01); *G06N 20/00* (2019.01); *H04L 47/748* (2013.01); *H04L 47/781* (2013.01)

(58) Field of Classification Search
CPC ... H04L 41/5096; H04L 43/50; H04L 47/823; H04L 63/1425; H04L 67/1023; H04L 67/1031; H04L 11/3438; G06N 20/00; G06N 3/08; G06N 5/04; G06K 9/6256; G06K 9/6262; G06F 9/505; G06F 15/173; G06F 21/552; G06F 2209/5019; G06F 9/50; G06F 9/5083; G06F 11/3438; G06Q 10/06
See application file for complete search history.

(56) References Cited

U.S. PATENT DOCUMENTS

| | | | | |
|---|---|---|---|---|
| 2014/0229610 | A1* | 8/2014 | Shen | G06F 9/505 709/224 |
| 2014/0280961 | A1* | 9/2014 | Martinez | H04L 41/5054 709/226 |
| 2015/0163311 | A1* | 6/2015 | Heath | G06Q 30/0236 709/204 |
| 2016/0352769 | A1* | 12/2016 | Bryant | H04L 63/1408 |
| 2016/0381116 | A1* | 12/2016 | Hui | H04L 67/04 455/425 |
| 2017/0004182 | A1* | 1/2017 | Simpson | H04L 67/306 |
| 2017/0005967 | A1* | 1/2017 | Simpson | G06Q 10/101 |
| 2017/0006032 | A1* | 1/2017 | Simpson | H04W 4/21 |
| 2017/0054592 | A1* | 2/2017 | Olrog | G06F 11/203 |
| 2017/0149687 | A1* | 5/2017 | Udupi | H04L 47/78 |
| 2018/0343170 | A1* | 11/2018 | Sridhar | H04L 41/22 |
| 2019/0044831 | A1* | 2/2019 | Guim Bernat | H04L 41/5045 |
| 2019/0130327 | A1* | 5/2019 | Carpenter | G06F 9/45558 |
| 2020/0034701 | A1* | 1/2020 | Ritter | G06N 3/0454 |
| 2020/0099710 | A1* | 3/2020 | Wu | G06N 20/00 |
| 2020/0174842 | A1* | 6/2020 | Wang | H04L 47/78 |
| 2020/0274894 | A1* | 8/2020 | Argoeti | H04L 63/1433 |
| 2020/0285737 | A1* | 9/2020 | Kraus | G06F 21/552 |
| 2020/0311573 | A1* | 10/2020 | Desai | G06Q 10/06315 |

OTHER PUBLICATIONS

[No Author Listed], keycdn. Proinity LLC. 2021:4 pages. https://www.keycdn.com/ [last accessed Jan. 22, 2021].

Chen et al., Phoenix: A weight-based network coordinate system using matrix factorization. IEEE Transactions on Network and Service Management. Dec. 2011;8(4):334-47.

Dabek et al., Vivaldi: A decentralized network coordinate system. ACM Sigcomm Computer Communication Review. Aug. 30, 2004;34(4):15-26.

De Vito et al., One-way delay measurement: State of the art. IEEE Transactions on Instrumentation and Measurement. Dec. 2008;57(12):2742-50.

Francillette et al., A players clustering method to enhance the players' experience in multi-player games. IEEE Proceedings of the 18th International Conference on Computer Games (CGames'2013 USA). Jul. 30, 2013:229-234.

Gummadi et al., King: Estimating latency between arbitrary internet end hosts. Proceedings of the 2nd ACM Sigcomm Workshop on Internet measurement. Nov. 6, 2002:5-18.

Gupta et al., Synthetic data for text localisation in natural images. Proceedings of the IEEE conference on computer vision and pattern recognition. 2016:2315-2324.

Liao et al., Network distance prediction based on decentralized matrix factorization. International Conference on Research in Networking (ICRN). May 11, 2010:15-26.

Mao et al., IDES: An internet distance estimation service for large networks. IEEE Journal on Selected Areas in Communications. Nov. 30, 2006;24(12):2273-84.

Mohammed et al., Artificial intelligence-based distributed network latency measurement. 2019 IEEE International Instrumentation and Measurement Technology Conference (I2MTC). May 20, 2019:1-6.

Winarno et al., Location based service for presence system using haversine method. 2017 International Conference on Innovative and Creative Information Technology (ICITech). Nov. 2, 2017:1-4.

* cited by examiner

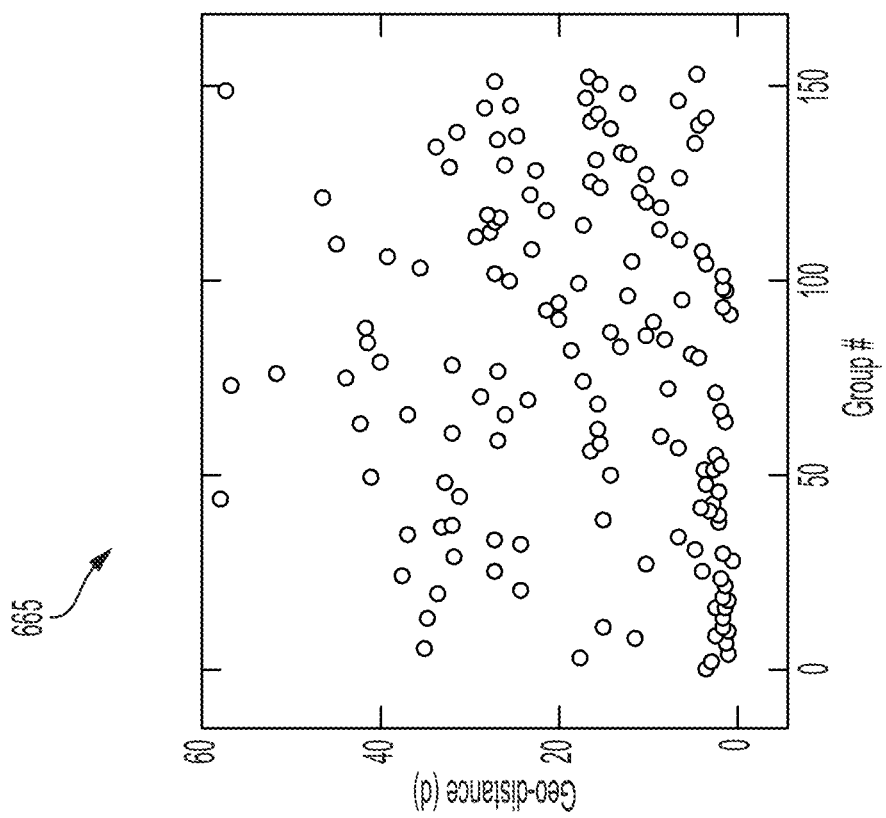

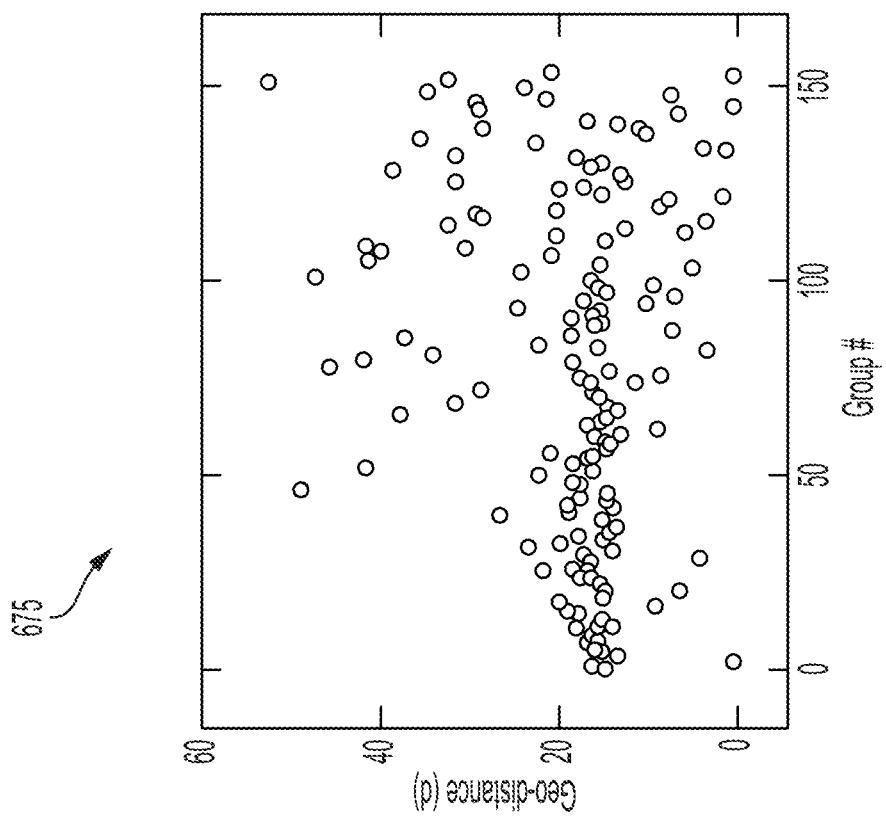

METHODS AND APPARATUS FOR NETWORK DELAY AND DISTANCE ESTIMATION, COMPUTING RESOURCE SELECTION, AND RELATED TECHNIQUES

TECHNICAL FIELD

The techniques described herein relate generally to methods and apparatus for estimating network delay, estimating network distances, selecting a computing resource from a plurality of computing resources to perform a computing process, and related techniques.

BACKGROUND OF INVENTION

Cloud computing paradigms shift storage and computing resources from local, on-site deployments to remote devices, typically leveraging the Internet. For example, edge cloud computing can be used to orchestrate compute services to end-users by using computing resources within the network to provide content and/or computation resources. Large numbers of servers can be allocated in geographically distributed datacenters in the cloud or as edge servers. A benefit of cloud computing is that since resources are shifted to the cloud, resources can be used as-needed and on a flexible basis. Such techniques can therefore reduce the overheard required by users' devices, since tasks traditionally performed by the user's devices can be offloaded to the edge cloud computing resources.

User requests for cloud services or edge servers come in on-demand over time. Additionally, cloud computing networks are ever-changing, with the addition of and/or removal of computing resources. Such on-demand request and changing network conditions can make it challenging to select compute resources to handle incoming requests.

SUMMARY OF INVENTION

In accordance with the disclosed subject matter, apparatus, systems, and methods are provided for estimating network metrics, including network delay and distances, and fairly selecting among available compute resources for users in a manner that takes into account both the network metrics as well as current users of the system.

Some aspects relate to a computerized method for selecting a computing resource from a plurality of computing resources to perform a computing process, the method including receiving, from a first remote computing device, first data indicative of a request to perform the computing process, accessing second data indicative of a first set of estimated metrics including, for each computing resource of the plurality of computing resources, a first estimated metric between the first remote computing device and the computing resource, and processing the second data using a machine learning algorithm to select a candidate computing resource from the plurality of computing resources to perform the process, wherein the machine learning algorithm selects the candidate computing resource based on: a second estimated metric between at least one second remote computing device and an associated computing resource from the plurality of computing resources performing a second computing process for the at least one second remote computing device, and a capacity of each computing resource of the plurality of computing resources.

In some examples, processing the second data using the machine learning algorithm includes processing the second data using a reinforcement learning algorithm, including: executing, for at least a subset of the plurality of computing resources, a reward function to determine a reward value for each computing resource of the subset of computing resources, and selecting the candidate computing resource from the subset of computing resources based on the determined reward values.

In some examples, processing the second data using the reinforcement learning algorithm includes processing the second data using a q-learning algorithm, and executing the reward function to determine the reward value for each computing resource of the subset of computing resources comprises computing, based on the reward function, data indicative of a quality for each computing resource of the subset of computing resources.

In some examples, the method further includes determining the subset of computing resources by eliminating any computing resources of the plurality of computing resources without capacity to perform the computing process from consideration by the reinforcement learning algorithm.

In some examples, the first set of estimated metrics comprise a first set of estimated distances, the second estimated metric comprises a second estimated distance, and selecting the candidate computing resource based on the second estimated metric between the at least one second remote computing device and the associated computing resource includes: selecting the candidate computing resource by determining (a) a first distance between the remote computing device and the candidate computing resource is less than (b) a second distance between the at least one second remote computing device and the associated computing resource.

In some examples, the first set of estimated metrics comprise a first set of estimated delays, the second estimated metric comprises a second estimated delay, and selecting the candidate computing resource based on the second estimated metric between the at least one second remote computing device and the associated computing resource includes: selecting the candidate computing resource by determining (a) a first delay between the remote computing device and the candidate computing resource is less than (b) a second delay between the at least one second remote computing device and the associated computing resource.

In some examples, processing the second data using the machine learning algorithm includes processing the second data using a plurality of machine learning algorithms to generate a plurality of sets of reward values for the plurality of computing resources, and analyzing the sets of reward values to select the candidate computing resource.

In some examples, analyzing the sets of reward values to select the candidate computing resource includes determining the candidate computing resource has a highest reward value among the sets of reward values.

In some examples, analyzing the sets of reward values to select the candidate computing resource includes normalizing the sets of reward values to generate normalized sets of reward values, and determining the candidate computing resource has a highest reward value among the normalized sets of reward values.

In some examples, accessing the second data indicative of the first set of estimated metrics includes computing, for each computing resource of the plurality of computing resources, a first estimated delay between the remote computing device and the computing resource by executing a trained machine learning model, including: inputting first identifying information for the remote computing device and second identifying information for the computing resource to the trained machine learning model, and receiving, from the trained machine learning model, the first estimated delay.

In some examples, inputting the first identifying information includes inputting a first IP address for the remote computing device, inputting the second identifying information includes inputting a second IP address for the computing resource, and receiving the first estimated delay includes receiving, from the trained machine learning model, an estimated round trip time between the remote computing device and the computing resource.

In some examples, inputting the first and second IP addresses includes extracting, for each of the first IP address and the second IP address, one or more of a geographical location, an autonomous system, a domain name server, a virtual private network, a continent name, and a country name, to generate first extracted location features for the remote computing device and second extracted location features for the computing resource.

In some examples, the method further includes encoding (a) one or more features of the first extracted location features and (b) one or more features of the second extracted location features from a non-numerical value to a numerical value.

In some examples, the method further includes computing, based on (a) one or more features of the first extracted location features and (b) the second extracted location features, a geographical distance between the remote computing device and the computing resource.

In some examples, executing the trained machine learning model includes executing a first trained machine learning model to generate a third estimated metric, wherein the first trained machine learning model was trained on local delay data, executing a second trained machine learning model to generate a fourth estimated metric, wherein the second trained machine learning model was trained on continental delay data, and generating the first estimated metric based on the third estimated metric and the fourth estimated metric.

In some examples, the first set of estimated metrics comprise a first set of estimated delays, and the second estimated metric comprises a second estimated delay.

In some examples, the first set of estimated metrics comprise a first set of estimated distances, and the second estimated metric comprises a second estimated distance.

Some embodiments relate to a non-transitory computer-readable media. The non-transitory computer-readable media includes instructions that, when executed by one or more processors on a computing device, are operable to cause the one or more processors to select a computing resource from a plurality of computing resources to perform a computing process, comprising receiving, from a first remote computing device, first data indicative of a request to perform the computing process, accessing second data indicative of a first set of estimated metrics comprising, for each computing resource of the plurality of computing resources, a first estimated metric between the first remote computing device and the computing resource, and processing the second data using a machine learning algorithm to select a candidate computing resource from the plurality of computing resources to perform the process, wherein the machine learning algorithm selects the candidate computing resource based on: a second estimated metric between at least one second remote computing device and an associated computing resource from the plurality of computing resources performing a second computing process for the at least one second remote computing device; and a capacity of each computing resource of the plurality of computing resources.

Some embodiments relate to a system. The system includes a memory storing instructions, and a processor configured to execute the instructions to select a computing resource from a plurality of computing resources to perform a computing process by performing receiving, from a first remote computing device, first data indicative of a request to perform the computing process, accessing second data indicative of a first set of estimated metrics comprising, for each computing resource of the plurality of computing resources, a first estimated metric between the first remote computing device and the computing resource, and processing the second data using a machine learning algorithm to select a candidate computing resource from the plurality of computing resources to perform the process, wherein the machine learning algorithm selects the candidate computing resource based on: a second estimated metric between at least one second remote computing device and an associated computing resource from the plurality of computing resources performing a second computing process for the at least one second remote computing device, and a capacity of each computing resource of the plurality of computing resources.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 6C shows a graph of the distribution of the geo-distance experienced by incoming users using an exemplary model that uses the standard deviation of the set of distances of the matched users-servers, according to some embodiments.

FIG. 6E shows a graph of the distribution of the geo-distance experienced by incoming users using an exemplary model that uses the absolute value of the change in the standard deviation of the set of distances of the matched users-servers, according to some embodiments.

DETAILED DESCRIPTION OF INVENTION

Figure 1:
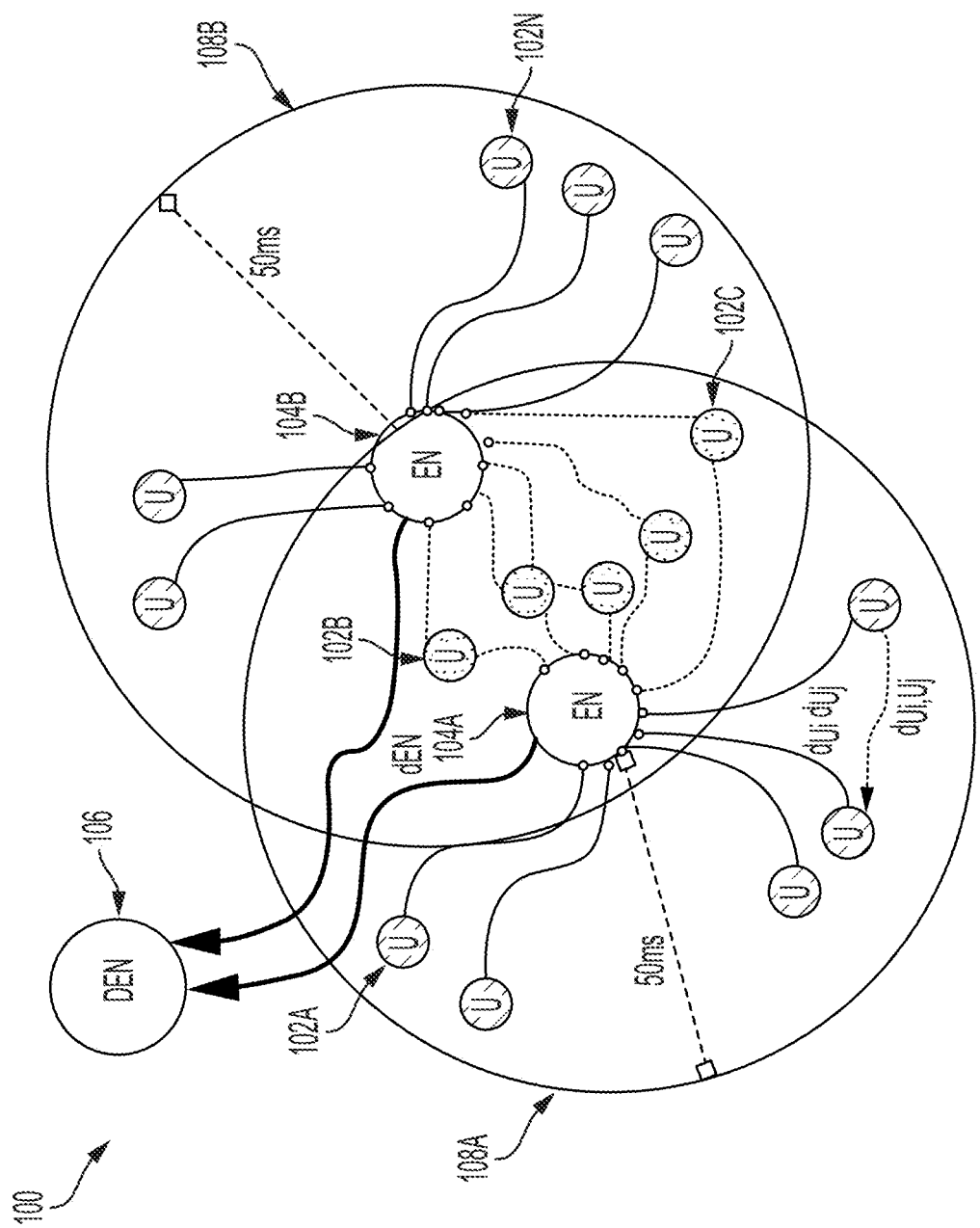
FIG. 1 is a diagram illustrating an exemplary online gaming subnetwork, according to some embodiments.

Various types of applications can leverage cloud computing resources, such as multiplayer cloud gaming, esports, virtual/augmented reality compatible applications, telepresence, telecollaboration, and/or the like. However, it can be challenging to select appropriate cloud compute resources for these and other applications. For example, esports can be challenging because of the highly interactive and engaging nature of the online games. Multiple (often geographically distributed) gamers playing a game together not only need to be able to watch the game scene with utmost focus, but also need to be able to react extremely quickly to perform actions during the game. Local player events are typically captured and sent to a server/cloud, which then broadcasts either the game state or the video of the rendered scene to the players. All of this has to be done fast enough as to not adversely affect the player's performance and Quality of Experience (QoE). Poor cloud computing services, such as low quality and/or high delay, can affect a user's game play, and potentially cause the player to lose the game. As such, ensuring that an esports system's response delay (e.g., which consists of network delay, processing delay, and playout delay) does not violate game delay threshold(s) can be a challenge. As another example, it is important to provide high audiovisual quality and low delay for video-conferencing tools. Poor cloud computing resources can result in broken and/or jittery communications, which in-turn results in a poor user experience. As a further example, low delay is important for real-time applications, such as telesurgery or teleoperation, where delay can have significant consequences.

The inventors have discovered and appreciated that delay can be an important factor when selecting among large numbers of geographically distributed computing resources to handle cloud-based applications. In particular, the network distance or delay can be used as a main factor when selecting among cloud computing resources. For example, as noted above, the esports the delay can include network delay, processing delay, and playout delay. But the playout delay may be negligible, and therefore may not have a significant impact on players' experience. Similarly, the processing delay typically depends on the available processing power in the cloud, which can be improved by using faster and/or more CPUs, GPUs, and memory. Therefore, the network delay can have the most adverse effect on esports systems. Further, the inventors have discovered and appreciated that it is also important to take into consideration delay variations among multiple users (e.g., multiple players of an esports game).

The inventors have developed technical improvements to conventional cloud computing and edge computing approaches to provide for real-time network delay estimation and selection of cloud and edge resources for computing tasks. The techniques can optimally connect incoming users of an online application to the most appropriate cloud/edge server, such that not only the maximum delay threshold(s) are adhered to, but also so that the delay variations experienced by different users of the application can be minimized among each other. Therefore, the techniques described herein can, in some examples, lead to a smoother, fairer, and higher quality group collaboration compared to conventional techniques.

Some embodiments relate to techniques for optimally assigning incoming users to cloud/edge servers. The techniques can leverage AI-based solutions, such as Reinforcement Learning (RL), and more particularly Q-learning. The techniques can learn an optimum server selection strategy using a reward function designed to incorporate fairness into the selection strategy. Various embodiments can use Q-learning with a uniformly bounded variance and large discount factors, multiple Q-learning approaches, local normalization, or some combination thereof.

Some embodiments relate to estimating the distance and/or delay between a requesting user and cloud/edge computing resources. The techniques can leverage AI-based solutions, such as Deep Learning (DL), to perform latency estimation based on identifying information of the devices (e.g., IP addresses). According to some embodiments, the techniques leverage a multimodal DL model. According to some embodiments, the IP addresses are used to extract features about the users and servers. The extracted features can be pre-processed for training the AI models. As described herein, the techniques can estimate, in a fraction of a second and with high accuracy, the distance and/or delay between the computing devices. The estimated information can be used to drive selection of cloud/edge servers.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Edge cloud computing techniques can reduce the overheard required by users' devices for computation tasks, since tasks traditionally performed by the user's devices can be offloaded to the edge cloud computing resources. In order to accommodate higher resource utilization in the cloud, however, cloud datacenter locations are often chosen to minimize the costs of cooling and power, rather than minimizing delay to end-users. In order to meet the desired quality of experience for highly delay-sensitive applications, distributing and deploying edge servers in the service area can provide for servicing end-users requests efficiently and with low latency. This can result in tens to hundreds of available resources that can be used to service a particular user. Therefore, choosing among servers is a complex task. But, if properly selected, edge cloud resources can reduce the latency of offloading tasks to the cloud by selecting computing resources closer to the end-user rather than offloading tasks to remote clouds (which can cause higher delays).

FIG. 1 As described herein, the inventors have appreciated that delay-sensitive applications and computationally expensive applications have introduced new considerations that must be addressed in order to provide users with an appropriate quality of experience. In particular, failing to meet the delay threshold of delay-sensitive applications can be a main reason that game service providers lose subscribers. FIG. 1 is a diagram illustrating an exemplary online gaming subnetwork 100, according to some embodiments. The simplified subnetwork 100 includes a plurality of users (U) 102A through 102N (collectively referred to herein as users 102), edge nodes (EN) 104A and 104B (collectively referred to as edge nodes 104), and delegated edge node 106. The edge nodes 104 and delegated edge node 106 can be part of, for example, a gaming service provider's gaming platform (e.g., where the edge/cloud infrastructure can be rented from cloud service providers and/or built proprietarily). The delegated edge node 106 can be a particular edge node that users are configured to connect to first when making an initial request for cloud resources. The delegated edge node 106 then decides which edge node 104 the user should connect to for performing requested computing processes. Therefore, according to some embodiments the network estimation and/or server selection techniques described herein can be executed by the delegated edge node 106.

While each edge node 104 can service multiple users 102, the edge nodes 104 only have a finite capacity. Therefore, the system can be configured to ensure that the delay experienced between a particular user 102 and a selected edge node 104 does not violate associated application-specific requirements, such as a specific game's delay thresholds. For example, if some users 102 are playing a cloud game together that has an end-to-end delay threshold of 100 msec, then the one-way delay between any user 102 and its associated edge node 104 should not be more than 50 msec, given a radius of 50 msec to each edge node 104 as shown by the radii 108A and 108B for edge nodes 104A and 104B, respectively. As shown in FIG. 1, some users 102 (e.g., users 102B and 102C) can connect to more than one edge node, namely either edge node 104A or 104B. The system can, additionally or alternatively, be configured to ensure that the delay experienced by the players in that session is comparable (e.g., such that the delay experienced by each player is as close to each other as possible) in order to minimize the delay variation among players. Such delay variation minimization can help provide a level playing field, a fair QoE, and/or the like.

Edge cloud architectures are often implemented using a large number of edge server nodes, such that implementations can require selecting from a large number of possible edge server nodes to execute a particular task. It should therefore be appreciated that FIG. 1 is a simplified network example. For example, while only two edge nodes 104 are shown, there may be dozens or hundreds of edge nodes available to service a user for a particular cloud application. As a result, edge server selection can be challenging for edge cloud architectures. This challenge can be further compounded by the fact that edge servers are typically limited in terms of their capability (e.g., processing capability), storage and communication resources, and therefore can be deployed with a limited set of services to satisfy limited types of tasks. This challenge can additionally or alternatively be complicated by movement of users' devices (e.g., such that it can be difficult to find a new edge server to sending the results after the services are completed by a previously assigned edge server).

Therefore, the inventors have discovered and appreciated that selecting an edge node for handling a particular task requires selecting from multiple options (e.g., many different available ENs) and multiple constraints (e.g., delay threshold, delay variation minimization, EN maximum capacity, and/or the like). Edge node selection is also a dynamic task, since players may join or leave at will, edge node architecture providers often dynamically deploy (e.g., via on-demand renting) more ENs and/or remove some ENs, and/or the like.

Conventional server selection techniques typically choose the closest servers to the requesting users. With such conventional techniques using first-come-first-served approaches like this, earlier users are often assigned to the closest nodes, while later users end up being matched with servers that are typically further away than the earlier users. For example, a new user will be connected to a server that has the lowest delay to that user. If that sever is too busy, then the server with the second-lowest delay is used. If that server is also busy, then the server with the third-lowest delay is used, and so on. This can cause significant unfairness between users, and eventually violate the delay threshold for incoming users (e.g., as discussed in conjunction with FIG. 6A). Some conventional techniques can assign an incoming user to the then-lowest delay edge node available, and move the user to a better edge node should one become available later. However, moving a user in the middle of a session (e.g., in the middle of playing a game) can result in high computational and/or communication overhead, and can also require constantly monitoring delays and server capacities to provide for reshuffling user/edge node assignments, which is typically non-trivial and adds even more overhead.

The inventors have discovered that a fairness metric can be used when selecting a compute node to address these and other issues. According to some embodiments, the fairness metric can be configured to match users with edge nodes by choosing the metric (a distance or delay) for new users to edge nodes based on existing metrics for existing users (e.g., based on the average distance or delay of the already matched users/edge nodes). Such a policy can be configured to have a low variance among the distances between the users and their associated edge nodes. For example, the closest edge node choices can be saved (e.g., and therefore not assigned to early users) for other nodes to preserve closer options for subsequent users. Such techniques can therefore, in a sense, perform a (e.g., suboptimal) matching where all nodes are matched with minimum distance variance. Therefore, some embodiments relate to edge node selection techniques that incorporate fairness into the edge node selection process. According to some embodiments, the techniques can be configured to select edge nodes in a manner such that not only are delay thresholds are met, but also so that distance/delay variation among players can be taken into consideration during selection, can be kept to a desired minimum variance, or both. Since conventional techniques do not factor in fairness, with conventional techniques some users will inevitably have lower delays and other users will have higher delays (e.g., which can be a serious issue with applications like esports, since players with lower delays may have an unfair advantage).

According to some embodiments, the techniques leverage AI models. In some examples, the techniques use Reinforcement Learning (RL) techniques, such as Q-learning. The techniques can include using RL techniques to learn an optimum server selection strategy using a reward function designed to incorporate fairness, among other considerations, into the selection strategy. As described herein, embodiments can use Q-learning approaches with a uniformly bounded variance with large discount factors, multiple q-table q-learning approaches, local normalization, or some combination thereof. According to some embodiments, for example, the reward function can use Quadruple Q-learning bagging along with a local min-max normalization to select the negative of U-EN delay, delay variation, derivative of delay variation, or the absolute value of the latter, depending on the system's state at that instance. Such techniques therefore do not require moving players because the RL approach can constantly learn and improve the model.

RL is a branch of machine learning (along with supervised and unsupervised approaches) that is focused on how actions should be taken in an environment to maximize the notion of cumulative reward. The model generally includes a set of states (S) and a set of actions (A) that can be taken by an agent. The model looks at the reward of transitions between states to determine which action results in the highest cumulative reward. RL can process the environment in discrete time steps. At each time (t), the agent receives the current state and reward, then chooses an action from the set of actions available at that time. The environment then moves to a new state and the reward associated with the transition is determined. The ultimate goal of RL techniques is to learn a policy that maximizes the expected cumulative reward. In the context of edge server selection, the definition of the reward function is therefore of importance to the overall model, as described further herein.

There are a number of different RL techniques, such as Monte Carlo-based techniques, Q-learning, State-action-reward-state-action (SARSA), Q-learning lambda, and SARSA lambda, among others. For example, Q-learning is a reinforcement learning algorithm that learns a policy (e.g., how to select an edge node for an incoming request) telling an agent (e.g., the DEN) what action to take (e.g., which EN to assign to a new user) under what circumstances (e.g., based on the then-current state of the edge node network). Q-learning finds an optimal policy in the sense of maximizing the expected value of the total reward over any and all successive steps, starting from the current state. "Q" refers to the function that returns the reward, which represents the quality of an action taken in a given state. Q-learning is flexible because it is a model-free algorithm that does not require a model of the environment. For illustrative purposes, the techniques described herein will be explained in conjunction with Q-learning. It should therefore be appreciated that while examples and embodiments described herein discuss Q-learning, the techniques are not limited to using Q-Learning, and can instead leverage other RL techniques without departing from the spirit of the techniques described herein.

Since edge networks are often dynamic and rapidly evolving, Q-learning models can be designed with a reward that enforces fair edge server selection. However, conventional Q-learning models will select the closest possible servers to a new user, even if their resources are not available (or a defined limit is reached). Therefore, as described herein, conventional Q-learning approaches are modified in order to apply Q-learning in the context of fair server-selection and server-user matching in edge cloud networks. In the case of edge cloud networks, the states (S) can represent the users joining the network and placing tasks requests, and the action space (A) can represent the available hosts/servers in the network that can handle those requests. Therefore, in some examples, the actions refer to the edge node servers, and the states refer to the users/requests.

Figure 2:
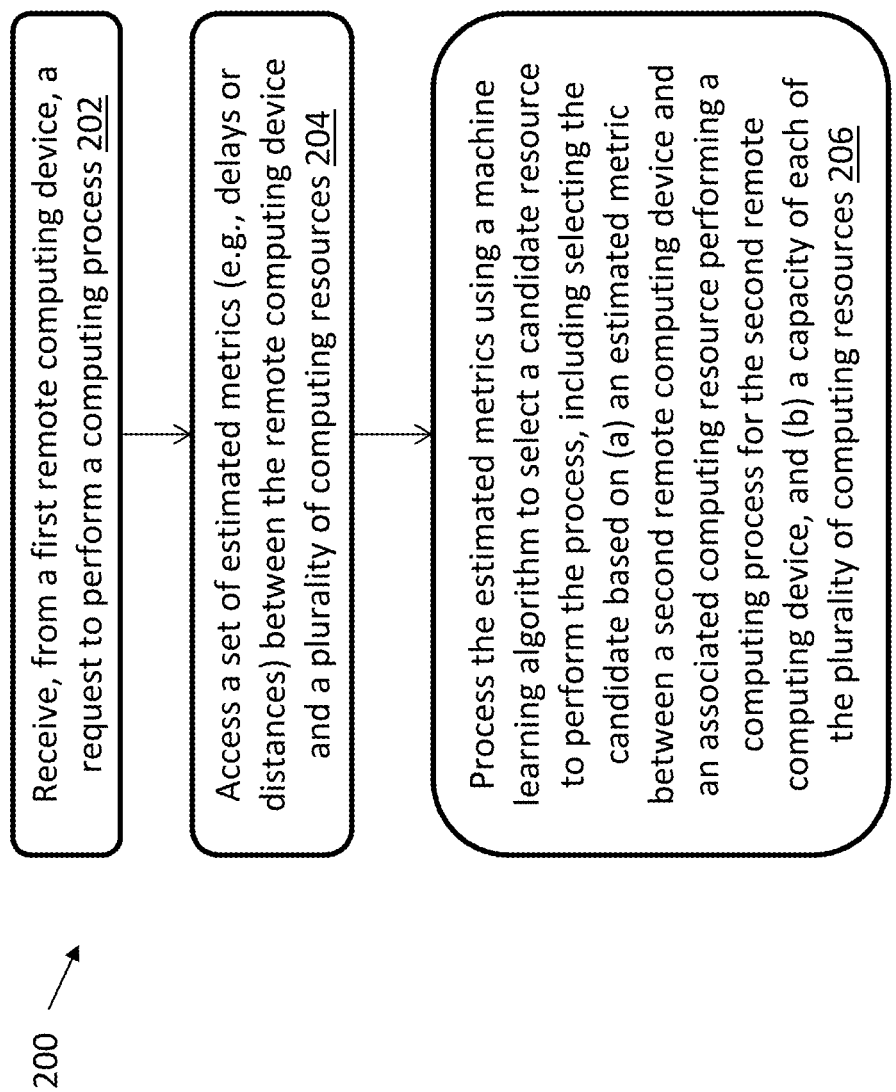
FIG. 2 is a flow chart of an exemplary computerized method for selecting a computing resource from a plurality of computing resources to perform a computing process using a machine learning algorithm, according to some embodiments.

FIG. 2 is a flow chart of an exemplary computerized method 200 for selecting a computing resource from a plurality of computing resources to perform a computing process using a machine learning algorithm, according to some embodiments. The method 200 can be performed by, for example, a DEN, such as the DEN 106 shown in FIG. 1. At step 202, the computing device receives, from a first remote computing device (e.g., from a first user device 102), a request to perform a computing process. For example, the computing device can receive a request from a user device to participate in an esports game, a video conversation, telesurgery, etc. At step 204, the computing device accesses a set of estimated metrics (e.g., estimated delays and/or distances). The set of estimated metrics includes, for each of the plurality of computing resources in the network, an estimated metric between the first remote computing device and the computing resource. For example, a set of estimated delays and/or distances can be received from or determined using the deep learning-based techniques described herein. At step 206, the computing device processes the second data using a machine learning algorithm (e.g., an RL algorithm, such as Q-learning) to select a candidate computing resource from the plurality of computing resources to perform the process. The machine learning algorithm selects the candidate computing resource based on estimated metrics (e.g., estimated delay(s) and estimated distance(s)) between computing devices and users assigned to those computing devices. As described further herein, this can include minimizing delay and/or distance variation among users.

According to some embodiments, as described herein the machine learning technique can be a RL technique. In some examples, the RL technique is Q-learning. The techniques can include executing, for at least a subset of the computing resources in the network (e.g., those with capacity to handle the request), a reward function to determine a reward value for each computing resource to handle the computing process. The computing device can select the ultimate computing resource to perform the computing process based on the determined reward values. The reward values can be indicative of a quality of each computing resource if it were selected to perform the computing process.

According to some embodiments, the techniques can take into account the capacity of the computing nodes in the network and suppress those servers (the actions (A)) accordingly. The machine learning algorithm also selects the candidate computing resource based on a capacity of each of the computing resources. As described herein, the network servers often have a variable range of capabilities and available processing times. Since the computing power of edge servers are therefore typically limited, it is possible that over time one or more servers reach a maximum limit of the number of requests it can handle. As a result, some actions/servers will be (or expected to be) unavailable at point(s) in time. It can therefore be desirable to consider the availability of those servers before taking the action and updating their Q-values accordingly.

According to some embodiments, any computing resources without capacity to perform the computing process can be removed from consideration by the RL algorithm (e.g., since the reward returned by taking an unavailable server could negatively affect choosing the server in the future). Unlike action masks, where the rewards are updated after the actions are sampled, action suppression can be used to remove those unavailable servers from consideration. The following exemplary algorithm illustrates this technique:

initialize Q(s; a) for all s∈S, a∈A(s), arbitrarily.
define $A_{available}$ for all possible a∈A(s)
set Q(terminal-state, •)=0
for each episode do
   initialize s, and total distances
   repeat (for each step of the episode):
     choose highest a for s using policy derived from Q (e.g., ∈-greedy)
     while a=a∉$A_{Available}$ do
       choose next highest a using the same policy
     total distances+=new distance (based on a distance function of the selected action)
     take action a, observe r, s' (according to a reward function)
     remove a from $A_{available}$ if limit is reached
     Q(s, a)←Q(s, a)+α[r,γ·$max_a$Q(s', a)-Q(s, a)]
     S←s'
   until s is terminal and $A_{available}$ isn't empty As shown by this exemplary algorithm, actions can be suppressed during the learning process when they are no longer available. Some embodiments can maintain an internal record of admissible actions. For example, a set of available actions can be maintained to keep track of the actions that are available in subsequent iterations. When choosing the action with the highest Q-value, the algorithm can also keep track of whether the action is available; if an action with the highest Q-value is not available, the computing device can choose the action with the next highest Q-value, and so on. Once the capacity of a single server has reached the maximum (or once it is desirable for the agent to stop choosing that server for some other reason or a limit), it can be removed from the available actions set before the next iteration.

Action suppression can have one or more beneficial impacts on the Q-learning model. For example, conventional Q-learning approaches can get stuck in sampling certain actions iteratively. Suppressing actions can therefore result in exploration of other actions that may not otherwise be explored. For example, if the eliminated action is a frequently selected action, it is possible that (without suppression) the action would be selected in later iterations. As a result, removing the highly chosen action from the available actions can force the algorithm to choose/explore other actions that are otherwise sub-optimal based on their sum of expected return of rewards. For example, the algorithm may choose the action with the second highest Q-value instead of that with the highest Q-value. Since the policy may sample an action in a ∈-greedy fashion, the next sampled action may not necessarily be the second highest Q-value action, since it could be a random action with E probability.

Action suppression can have a regularization effect on RL techniques that can avoid overfitting. In particular, removing actions can ignore their effect on choosing the next action. This can result in a form of regularization in training since removing actions can break the exploitation cycle (e.g., which can be important, for example, in cases were actions and state spaces are large, as with edge node networks) Eliminating actions can lead to building a more sophisticated algorithm that can capture more insights from the network. The actions that are eliminated can be, for example, actions that may be in high demand at certain areas and/or times. Such information can be used, for example, to make recommendations on where to deploy servers. Adding more factors used by the RL algorithm can result in building a smarter agent that learns and predicts the next state of the network. For example, the capacity left in servers could also be employed in their selection in order to avoid overhead on certain servers while others are available within the acceptable range.

According to some embodiments, the techniques include specifying the reward function used for the RL technique. As a general matter, the reward function can be determined based on what the agent is expected to learn, the dynamics of the environment, and/or the like, since the output of the Q-table is based on the reward function. In terms of the techniques described herein, the reward function can be designed for fair server selection with a goal of matching users with servers fairly among all users. As described further herein, according to some embodiments the reward function can be designed to take into account the distance between current users and their matched servers, the delays between the users and the matched servers, or both, to provide for fair compute resource allocation. For example, the distance between the requesting user and the compute resource ultimately selected to handle that requesting user can be determined based on the distances between current users and the associated compute resources handling those users. According to some embodiments, the techniques can include matching a user to a server with a distance that is closer on the global average of distances among other users (e.g., all other users) in the network. In some examples, a global variable of the total distances/delay can be used and updated at every iteration in order for the cumulative distance/delay to be reflected in the reward of that action. Further, the techniques can include taking into account the variance of delays between both the current users and their associated compute resources, as well as the new user (e.g., to optimize the variance of delays for users).

As explained further herein, various models can be used, including models with bagging and/or local normalization.

The examples provided herein describe different reward functions, and associated models that can be generated based on individual reward functions as well as combinations of reward functions. As also described herein, the models can be designed with negative rewards as a function of the sum of the metric (distances/delays) between users and servers. Such a negative reward can, for example, reinforce the agent to select actions that will minimize the global sum of the metric (e.g., which in-turn can be reflected by the Q-value of that action). The exemplary models below are described based on distance, but it should be appreciated that other metrics can be used, such as delay, user ratings, etc. In particular, the techniques can include developing the models to reinforce fairness as explained herein regardless of the metric used (e.g., delay, geo-distance, user ratings, etc.), such that any metric can be used with the techniques described herein.

According to some embodiments, the reward function can be based on the negative Geo-coordinate distance (d) as a reward (e.g., Reward=−1*d). To train the agent to reduce the geo-distance, in such a model the reward can be the negative value of the single distance of the matched pair. Such a model can train the agent to pick the lowest distance possible, which will potentially have the highest Q-value given the state of the network. According to some embodiments, the Geo-distance between an edge node (e) and a user (u) can be calculated using their longitude (long) and latitude (lat) by as shown below using Equation 1:

$$d = \sqrt{(e_{long} - u_{long})^2 + (e_{lat} - u_{lat})^2}$$ Equation 1

According to some embodiments, the reward can be based on the standard deviation (STDV) of the set of distances (D) of the matched users-servers (e.g., Reward=−1*STDV(D)). Such a reward function can reduce the global average of the user-server distances by setting the reward to be the negative value of the current STDV of the distances of the current connections. This is the same concept as tracking the change of the global distances (e.g., the derivative of the global distances) throughout training. Since the agent's selection affects the average, using such a reward can train the agent to make choices that minimizes the global STDV, therefore, matching users and servers with a distance closer to the average distance.

According to some embodiments, the reward can be based on the change in the STDV of the set of distances (D) of the matched users-servers (e.g., Reward=−1*Δstdv(D)). This reward function therefore considers the derivative of the STDV of distances, which could be a negative or a positive change.

According to some embodiments, the reward can be based on the absolute value of the change in the STDV of the set of distances (D) of the matched users-servers (e.g., Reward=−1*|Δstdv(D)|). As noted above, since the change of the STDV could be a negative or a positive change, the change can be unified by using the absolute value. Such an approach can result in the change being more meaningful. Additionally, or alternatively, the goal is to minimize the change in the STDV regardless of the sign, therefore, the reward function can use the absolute value of the change.

Figure 3:
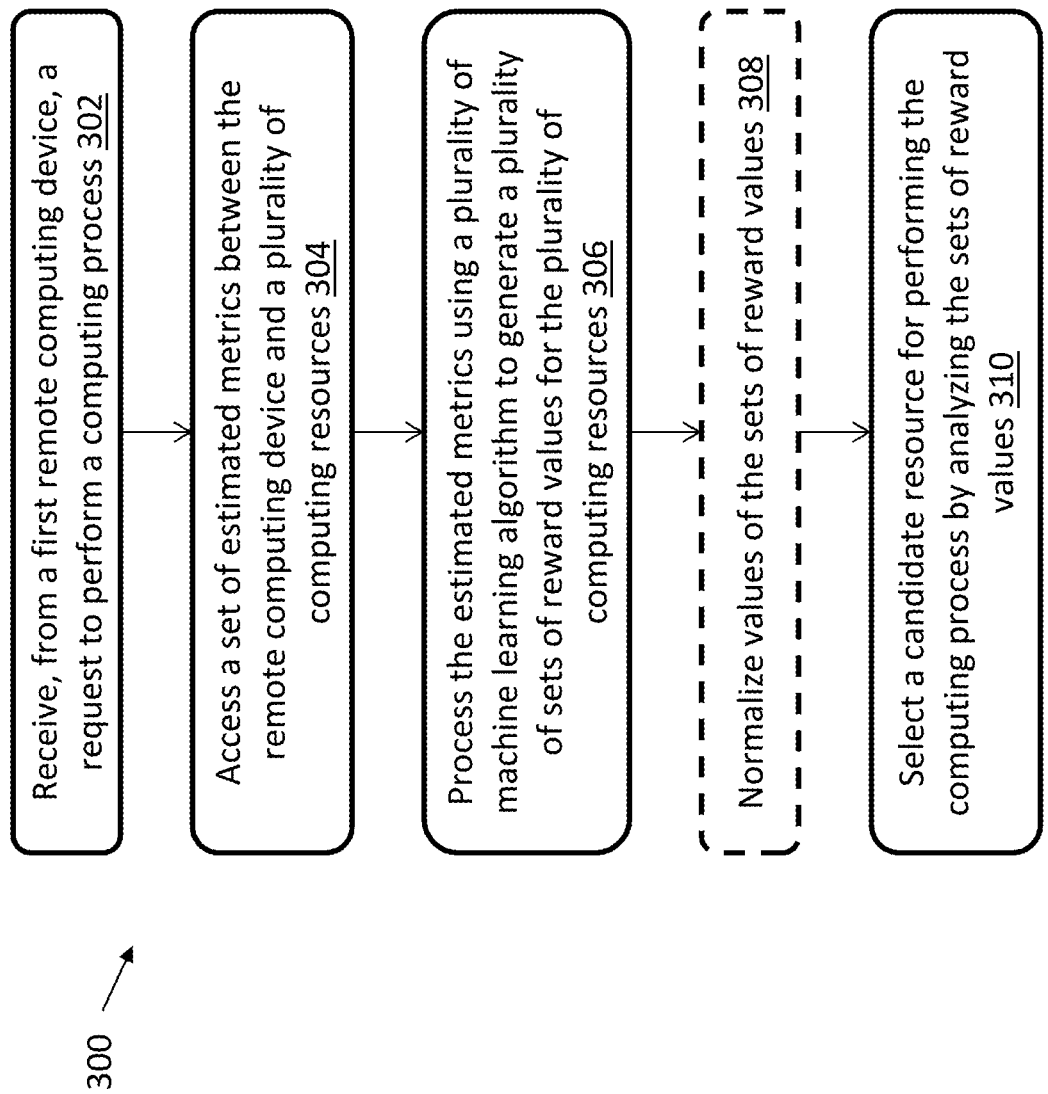
FIG. 3 is a flow diagram of an exemplary computerized method for using a plurality of machine learning models to select a candidate resource, according to some embodiments.

According to some embodiments, multiple models can be combined (e.g., via bagging). FIG. 3 is a flow diagram of an exemplary computerized method 300 for using a plurality of machine learning models to select a candidate resource, according to some embodiments. The method 300 can be executed by, for example, the DEN in FIG. 1. At step 302, the computing device receives, from a remote computing device (e.g., a user 102 in FIG. 1), a request to perform a computing process. At step 304, the computing device accesses a set of estimated metrics (e.g., estimated delays or distances) between the remote computing device and a set of candidate computing resources (e.g., the ENs 104 in FIG. 1). At step 306, the computing device processes the estimated delays using a plurality of machine learning algorithms to generate a plurality of sets of reward values for the set of candidate computing resources. Optionally, at step 308, the computing device normalizes values of the sets of reward values. At step 310, the computing device selects a candidate resource for performing the computing process based on the sets of reward values to select the candidate computing resource (e.g., determining the candidate computing resource that has the highest reward value among the (optionally normalized) sets of reward values).

Referring to step 306, the multiple models can be aggregated according to various techniques. For example, two models, three models, four models, and/or any number of models can be combined for execution. For example, the four models discussed above, namely models based on (1) Geo-coordinate distance, (2) the standard deviation of the set of distances of matched users-servers, (3) the change in the STD of the set of distances, and (4) the absolute value of the change in the STD of the set of distances, can be aggregated. Aggregating multiple models can improve server selection results. Since multiple models can be designed to operate on the same problem, combining the Q-tables of the models can lead to creating a different model that leverages the experiences of the individual models (e.g., in reducing the variance of distance). According to some embodiments, if combining four models (e.g., referred to as Quadruple Q-Learning (QQL)), the overall model can analyze each state in the four corresponding Q-tables and select the action from the table with the highest Q-value. As a result, the model that has the highest Q-vales would influence the next decision of the agent. Each of the models can elect an action to be taken for the current state where the agent is at, and then the elected action with the highest Q-value can be chosen.

Figure 4:
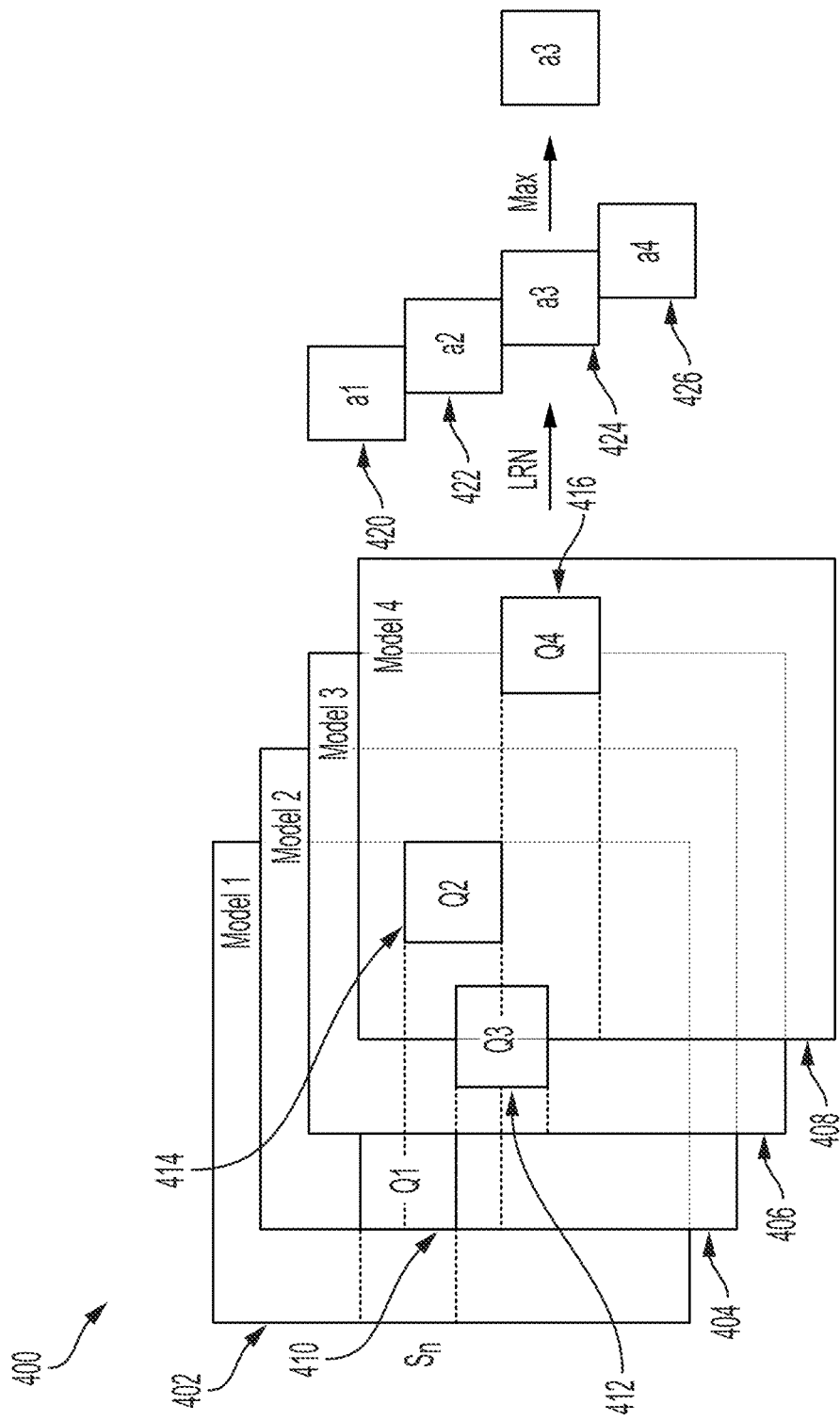
FIG. 4 is a diagram showing an exemplary model that uses quadruple Q-learning with normalization, according to some embodiments.

Referring to step 308, the range of Q-values when combining a model (e.g., QQL) can depend on the combination of the settings used in training. For example, the values could have different scales affected by the number of episodes and reward function they were trained on. Therefore, in order to compare different Q-tables that have different scales, the values can be normalized. FIG. 4 is a diagram showing a model 400 that uses quadruple Q-learning with normalization, according to some embodiments. The model 400 includes Q-tables (representing Q-values of a single state) for a first model 402, a second model 404, a third model 406, and a fourth model 408. Each row of the Q-tables 402-408 can be normalized with the min-max values of that row. As illustrated, values Q1 410, Q2 412, Q3 414 and Q4 416 are normalized to a1 420, a2 422, a3 424 and a4 426 (with the maximum being a3). For example, Equation 2 can be used to normalize the value at $X_{i,j}$ based on the minimum and maximum values, $X_{min}$ and $X_{max}$, of that row i:

$$X_{norm_{ij}} = \frac{x_{ij} - x_{min_i}}{x_{max_i} - x_{min_i}}, \forall\, i \in \text{rows}, \forall\, j \in \text{columns}$$ Equation 2

According to some embodiments, the techniques can include using an approximation function to approximate Q-values of new states and new actions (e.g., based on the k-closest neighbors). Q-learning is typically designed to handle a finite and a pre-defined space of actions and states. Since the number of incoming users and servers is dynamic, a fixed-sized Q-table may therefore not handle such a dynamic scenario. Therefore, according to some embodiments, an approximating function can be used to map new states and new actions to the current Q-table. The approximation function can, for example, average the Q-values of the k-nearest neighbors of the new state (user) or the action (server), and then build a record of the new entry. As another example of a technique that can be used to map new states and actions, some embodiments can use a learning approach as a regression problem. In such embodiments, the Q-values can be learned through a neural network regressor that is trained on a history of entries.

According to some embodiments, the Q-table can be implemented based on a dynamic HashMap. Since the network is expected to have more users requesting to join over time, the algorithm can be designed with sufficient scalability to handle such continued requests by new users. Therefore, the Q-tables can be implemented using dynamic HashMaps (which can also be referred to as dictionaries or hashtables). Such HashMaps can provide for efficient lookups, appending, and removal of instances associated with a given key. Therefore, HashMaps can help fit a changing, scalable, and dynamic environment such as that of edge clouds.

According to some embodiments, the techniques included collecting the data and pre-training the models. In order to train and/or test the models on a simulated edge cloud, data can be collected to reflect the dependencies and the distribution of the users. Gaming environments, for example, are extremely lag-sensitive. Therefore, data collected from a gaming community can carry a lot of information about the geographical distribution of users, the range of QoS measurements, computing capabilities, and/or the like. For some exemplary testing of the techniques, distance was tested using one hundred and fifty-three (153) users and one hundred and fifty-three (153) simulated edge servers. During the game play, a script was run on each Swarmio server to collect network QoS measurements about users' delay and jitter, along with their IP address and location. The majority of the players/users (around 84% of the users, in this example) were in North America. The collected data included: longitude, latitude, timestamp, and some statistics on the collected network QoS. Longitude and Latitude were not only used to locate the users geographically, but also used to theoretically represent the delay between nodes. Finding the optimal fair match between all the 153 users with the 153 edge servers would have the probability of $$\frac{1}{153!} = \frac{1}{2 \times 10^{269}}.$$

Figure 5:
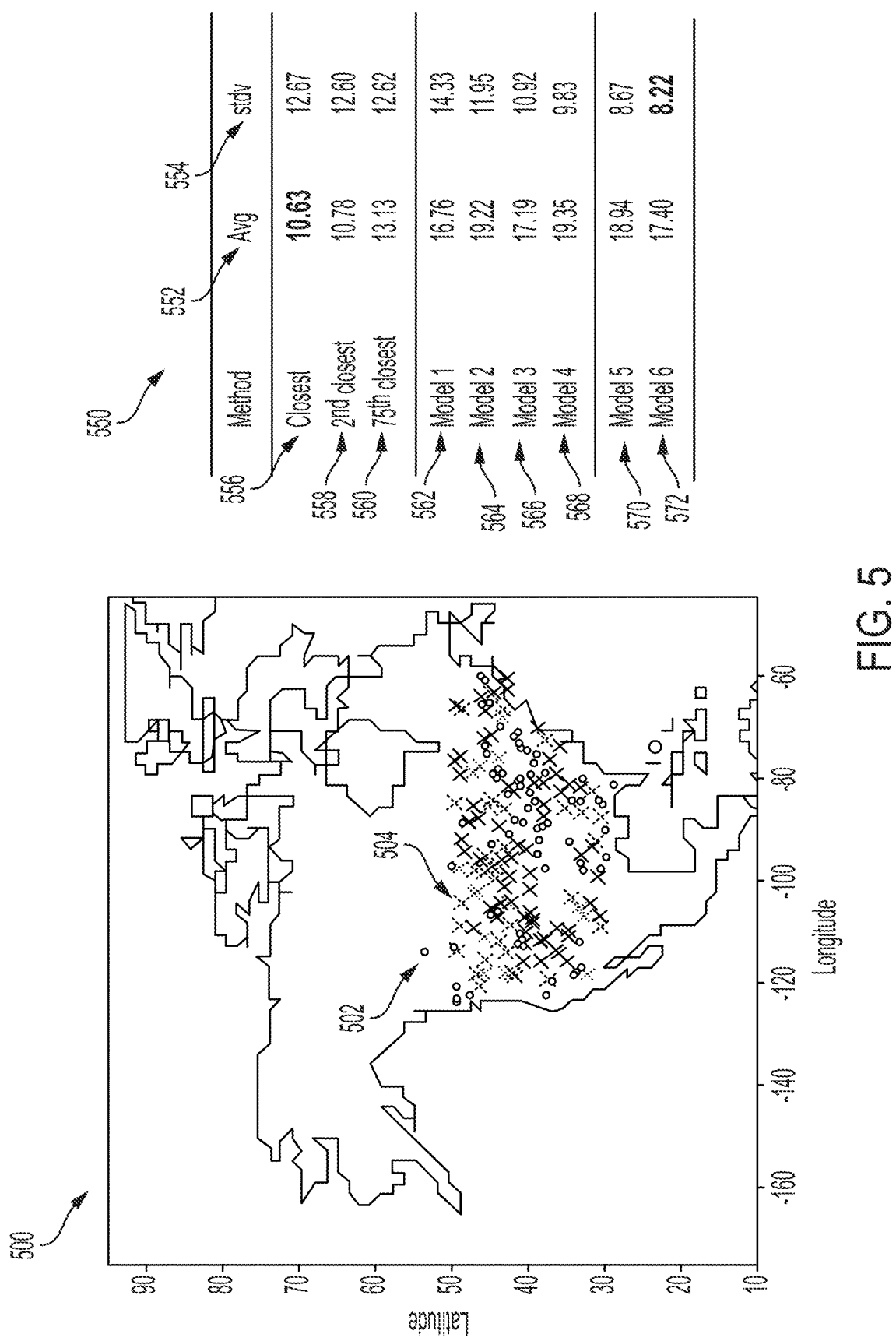
FIG. 5 is a diagram illustrating the distribution of the users of the collected data in North America and the results of a set of experiments, according to some embodiments.

The data was used to conduct single session experiments. For this set of experiments, Longitude and Latitude were used to represent the geo-location of the nodes. FIG. 5 is a diagram 500 illustrating the distribution of the users of the collected data in North America, according to some embodiments. The users are shown as dots (e.g., dot 502) and edge servers are shown as (X) (e.g., X 504) in North America. Throughout training and hyper-parameter optimization, the following values were adopted for the hyper-parameters to all the models and experiments: the learning rate ($\alpha$=0.1), the reward's discount factor ($\gamma$=0.6), the exploration factor epsilon ($\in$=0:1), and the number of training epochs (epochs=100000).

All the experiments were run individually in order to reflect the use-case of personalized applications. All the results and reported matrices were collected on a single node basis (such that fair selection was applied with respect to individual requests). The experiments assumed that users were pre-connected to a session beforehand, and each user was requesting a task to be connected to a server in the cloud. To reflect the case of a personalized applications, the available 153 users were used as states in the model. In order to have a matching number of actions, as noted above the testing used a simulated one hundred and fifty-three (153) different edge nodes in North America to serve as servers and session hosts. The main goal in the experiment was to validate the hypothesis of using RL for fair selection (where fair selection is modeled based on the lowest standard deviation of delays or distances). FIG. 5 also includes a table 550 that shows the results of the experiments, including the average geo-distance (shown as 'avg' 552) between the assigned users-server pair, and the standard deviation of the distances (shown as 'stdv' 554). As explained previously, the testing used the geo-distance, but the same context applies to the delay since both are proportional (e.g., the delay can be proportional to the distance).

In order to compare the models with a traditional method of matching, three different models were built for the sake of comparison. The first model (shown as "Closest" 556 in FIG. 5) matches the user to the closest available server node based on the geo-distance. In order to see the effect of choosing a farther server on the STDV of distances, the second model (shown as "$2^{nd}$ closest" 558) matches the user to the second closest available server. Thirdly, for a somewhat extreme comparison, the first half of the users (76 users, in this example) were matched to the servers that are in the $50^{th}$ percentile of distance ($75^{th}$ closest server), while the other half of the users were matched using the closest. This is shown as "$75^{th}$ closest" 560. Additionally, six selection models were built, namely based on geo-location (Model 1 562), STDV (Model 2 564), change in STDV (Model 3 566), absolute value of the change in STDV (Model 4 568), a combination of Models 1-4 (Model 5 570), and a combination of Models 1-4 with normalization (Model 6 572). As shown in the table 550, Model 6 has the least STDV among all the designed models with a reduction of 35% of using the closest server Model 1 as matching method. It can also be seen that using the $2^{nd}$ and $75^{th}$ closest matching Models 2-3 started to reduce variance, while slightly increasing the average.

Figure 6A:
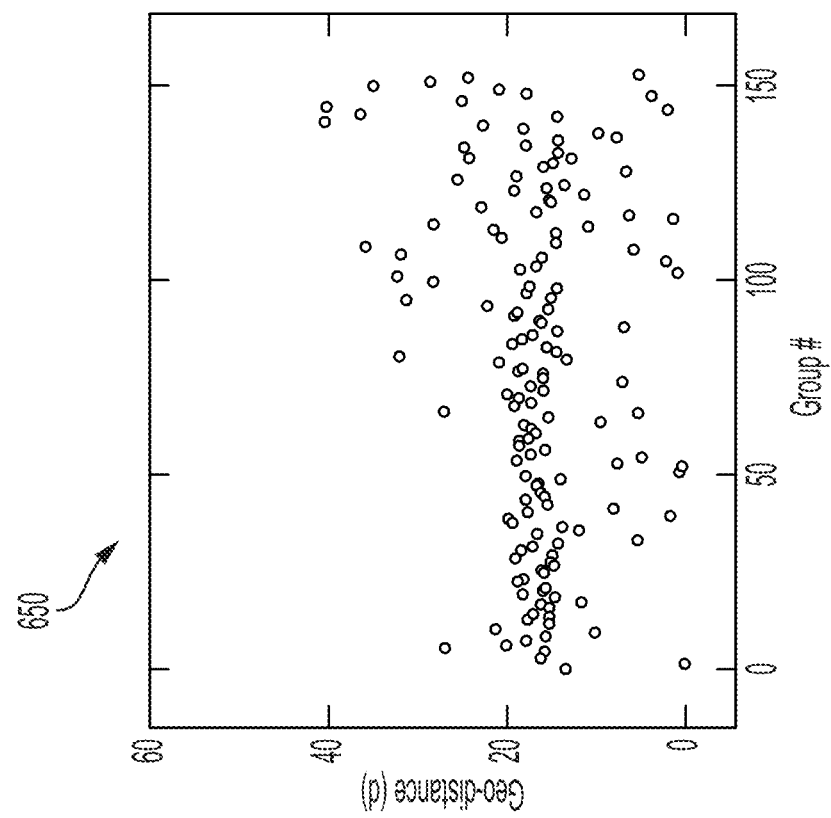
FIG. 6A shows a first graph of the distribution of the geo-distance experienced by incoming users using the shortest-delay method, and a second graph of the distribution of the geo-distance using an exemplary model that bags four models and uses normalization, according to some embodiments.
Figure 6A:
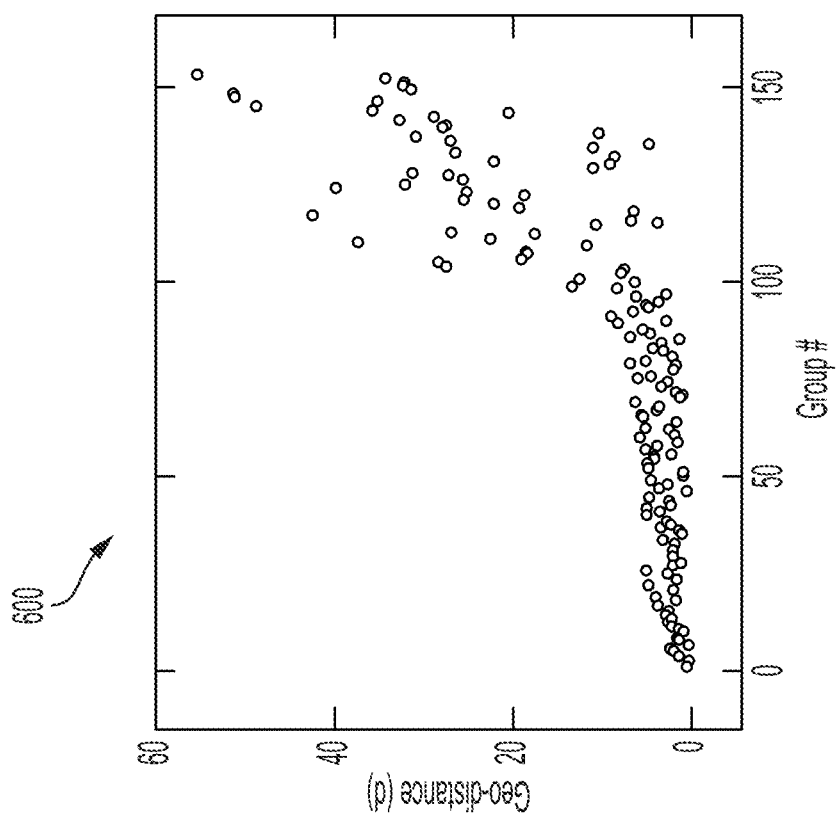

FIGS. 6A-6F show graphs of test results, according to some embodiments. FIG. 6A shows a first graph 600 of the distribution of the delay experienced by incoming users using the shortest-delay method, and a second graph 650 of the distribution of the delay using Model 6 (aggregating Models 1-4 with normalization), according to some embodiments. In FIG. 6A, the vertical axes of graphs 600 and 650 are the geo-distance (d), and the horizontal axes are the group number, namely the user number in incremental order based on when the user connected to the system. As shown by graph 600, the shortest-delay method starts by assigning the first users to the available servers with a low distance, but then just past user 100 there is a noticeable increase in the distance due to the unavailability of closer nodes. On the other hand, graph 650 shows that Model 6 starts by assigning users to servers with a distance very close to the average distance (17.40), and therefore the STDV and the variance 296 of the values are lower, demonstrating that the selection was significantly more fair than the shortest-delay method.

Figure 6B:
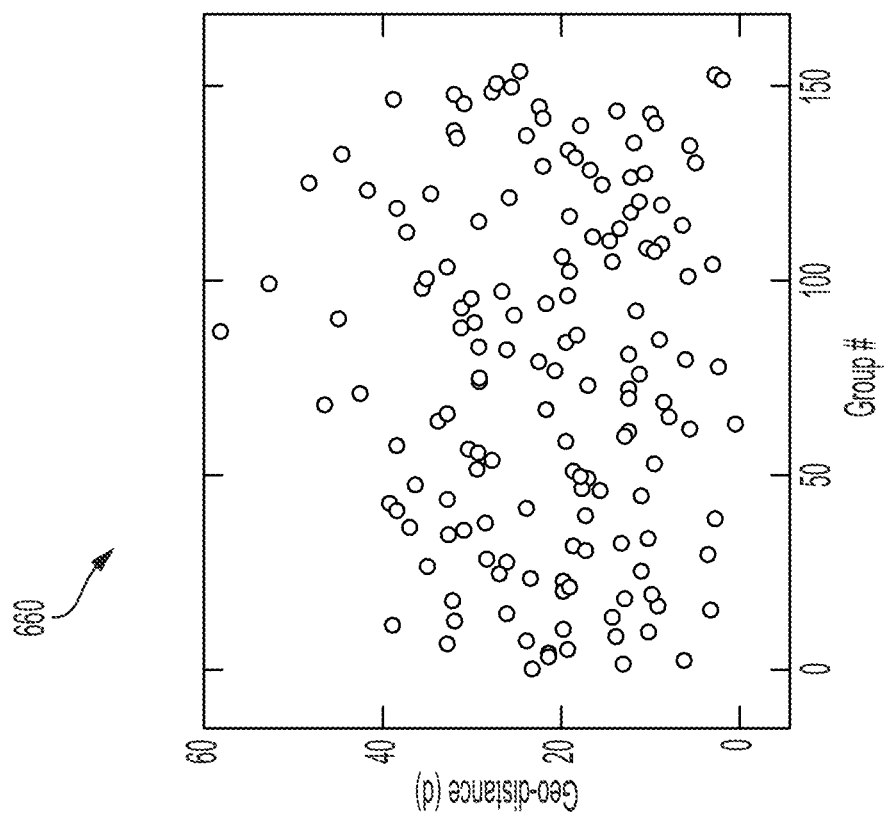
FIG. 6B shows a graph of the distribution of the geo-distance experienced by incoming users using an exemplary geo-coordinate distance model, according to some embodiments.
Figure 6D:
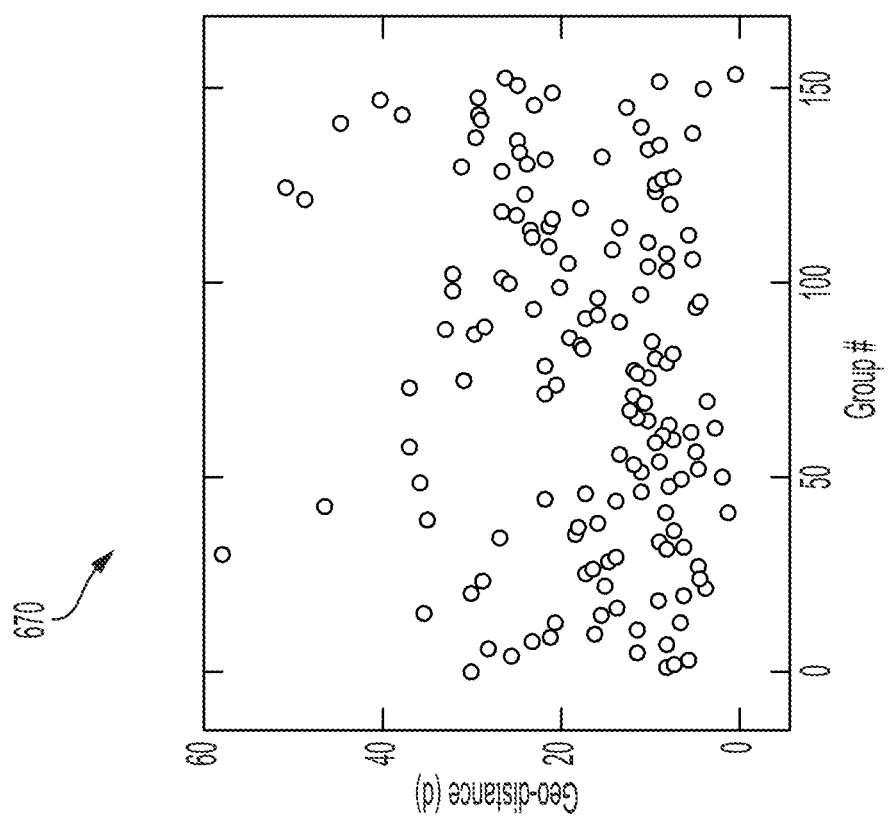
FIG. 6D shows a graph of the distribution of the geo-distance experienced by incoming users using an exemplary model that uses the change in the standard deviation of the set of distances of the matched users-servers, according to some embodiments.
Figure 6F:
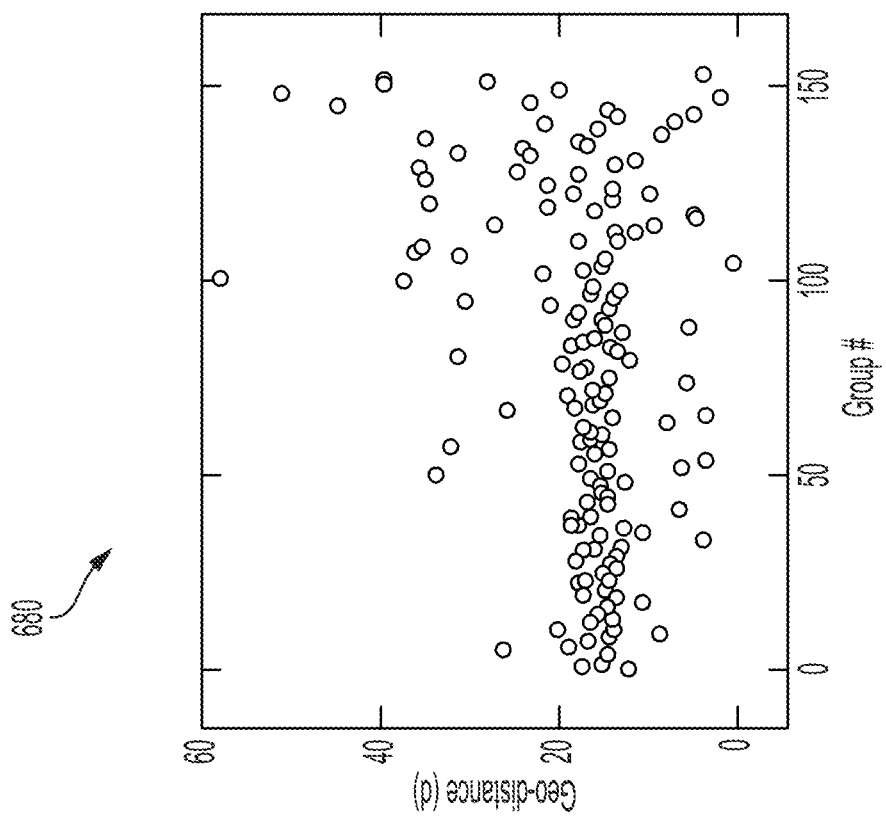
FIG. 6F shows a graph of the distribution of the geo-distance using an exemplary model that bags four models without normalization, according to some embodiments.

FIG. 6B shows a graph 660 of the distribution of the geo-distance experienced by incoming users using Model 1 (geo-coordinate distance), according to some embodiments. FIG. 6C shows a graph 665 of the distribution of the geo-distance experienced by incoming users using Model 2 (the standard deviation of the set of distances of the matched users-servers), according to some embodiments. FIG. 6D shows a graph 670 of the distribution of the geo-distance experienced by incoming users using Model 3 (the change in the standard deviation of the set of distances of the matched users-servers), according to some embodiments. FIG. 6E shows a graph 675 of the distribution of the geo-distance experienced by incoming users using Model 4 (the absolute value of the change in the standard deviation of the set of distances of the matched users-servers), according to some embodiments. FIG. 6F shows a graph 680 of the distribution of the geo-distance using Model 5 (bagging Models 1-4 without normalization), according to some embodiments.

Since Models 5-6 aggregate 4 different models and select one out of the 4 models every epoch, the experiments included monitoring which model was used for each selection. For Model 5, the results showed that Model 3 was used 143/153 times, where model 4 was used 10/153 times, and therefore shows that Model 3 had the best Q-values in most cases of the states. For Model 6, the results showed that Model 3 was used 139/153 times, Model 4 was used 7/153 times, and Model 2 was also used 7/153 times. This further shows that Model 3 had the best Q-values in most cases of the states, while using the combination of different models could enhance the results overall.

It should be appreciated that the techniques described herein can have a broader impact than cloud/edge server selection. In particular, the produced models can not only be used for edge cloud server selection, but the same logic and techniques could be applied to different practical problems under, for example, point-to-point matching, cardinality, connectivity constrains problems, and/or the like. These problems can include, for example, matching students to schools, ad slots to advertisers, and/or search results to ranked positions, while using corresponding constrains (e.g., students' school choice, ad relevance to users, and the click through rate of the search result). Therefore, while embodiments are described in conjunction with edge server selection, it should be appreciated that the techniques can be applied to various selection scenarios.

To operate, resource selection techniques (including those described herein, as well as other techniques) often use the distance or delay between the user and edge node in the selection process. In particular, the evolution of large-scale distributed applications has caused a need for network distance and/or latency measurements. For example, applications such as multiplayer online games, content distribution networks (CDNs), and peer-to-peer (p2p) networks, among others, use network latency measurements to perform tasks such as performance optimization, providing acceptable Quality of Service (QoS), and/or the like. As another example, network latency can be used to determining the scalability level of distributed applications.

Conventional tools typically determine network delay by making explicit delay measurements. The inventors have discovered and appreciated, however, that it may not be practical to explicitly measure the network delay in some scenarios. For example, it may not be possible to measure delay for large distributed compute platforms due to the scale of such platforms (e.g., due to the large number of edge nodes (e.g., even with a restricted delay radius), large number of users, and/or the like). Therefore, while conventional measurement tool can be useful to monitor the delay once a server has been selected, it may not be possible to use such techniques to select compute resources. As another example, explicit delay measurement may not be feasible in the 5G era, since the number of edge node options for a user in 5G could be too large to explicitly measure the delay between all users and each candidate edge node (e.g., since such measurements could cause a tremendous amount of traffic that would adversely impact the network).

The inventors have therefore developed techniques to estimate distances and/or delay between source and destination devices in a network. Delay estimation in large scale systems, such as massively multiuser systems, can conventionally be done with Network Coordinate Systems (NCSs) to estimate the round-trip time (RTT) between pairs of nodes. However, each node in the NCSs requires a batch of explicit measurement to locate themselves. In other words, each node uses explicit measurements to calculate their network coordinates (e.g., such that the Euclidean distance between any node-pair is equal to the delay between them). Further, the NCS typically requires a fairly long time to reach a steady state at which each node can successfully calculate its coordinates.

Further, NCS models suffer from various drawbacks. NCS can be implemented using a Euclidean distance model (e.g., Vivaldi and/or global network positioning (GNP)) or a matrix factorization model. The Euclidean distance-based model assumes a symmetric distance between any pair of nodes, but this is not always the case, since the network routing between the pairs is asymmetric. The matrix factorization model does not consider the geographical distances between the network nodes that introduce constant propagation delays. It can also be hard to know the exact rank of the true latency matrix from the noisy measurements. Further, both NCS models require a nontrivial convergence time, which is proportional to the total number of network nodes. Moreover, the precision of both NCS models depends on the number of explicitly measured RTT to the node's neighbors. Thus, the more the neighbors, the more accurate the model will be, but consequently, more computation and overhead is imposed on each node.

The inventors have developed improvements to delay estimation techniques that leverage AI models to perform the estimation. The techniques can include using AI, including deep learning (DL) algorithms, to use IP addresses to perform latency estimation. The AI-based techniques can estimate delay with high accuracy. For example, as described further herein, the inventor's conducted experiments to train a DL model using the KING data set, which the inventors found can estimate delay with approximately 96.1% accuracy. According to some embodiments, the techniques only require a one-time training, after which the techniques can estimate, in a fragment of second, the latency between any pair of nodes. According to some embodiments, the techniques leverage a multimodal DL model. According to some embodiments, the IP addresses are used to extract features about the users and servers (e.g., using KeyCDN and/or proprietary services). The extracted features can be pre-processed for training the AI models. According to some embodiments, the system can be retrained as needed (e.g., if the accuracy degrades below a certain threshold). Such training can be done incrementally, instead of retraining the model from scratch.

The AI-based network prediction techniques described herein can address one or more problems with conventional approaches. As explained above, for example, NCS techniques require explicitly measuring delay values to generate the model. As a result, NCS needs a fairly long time to reach steady state. Furthermore, as new nodes join, it can take a considerable amount of time to determine coordinates for those new nodes. As a result, users can experience significant delays in server selection. In the esports scenario, players will typically not wait this long to connect to the system (or wait every time the network changes and needs to recompute the model). The techniques described herein do not require making any explicit latency measurements during operation, and therefore do not have suffer from such convergence issues. Rather, the techniques can be used to estimate the delay nearly instantaneously (e.g., in milliseconds), while maintaining and/or improving the accuracy of conventional techniques.

Figure 7A:
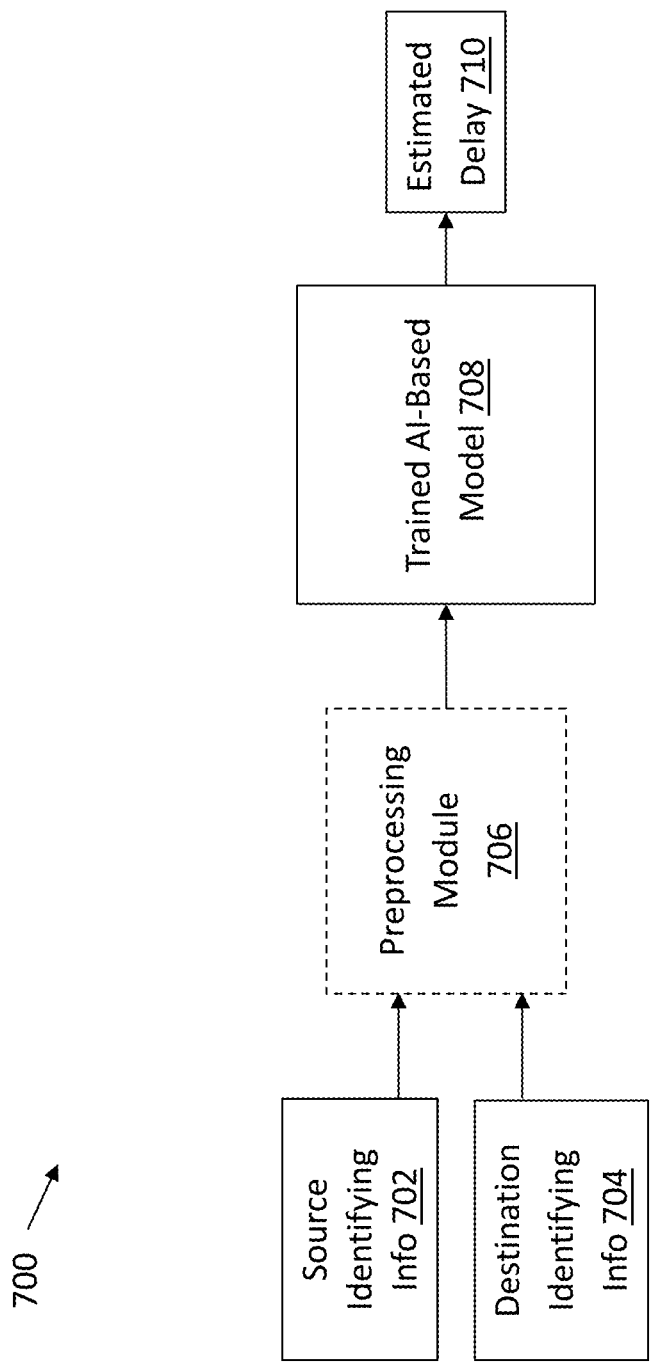
FIG. 7A is a diagram showing an exemplary AI-based delay estimation system, according to some embodiments.
Figure 7B:
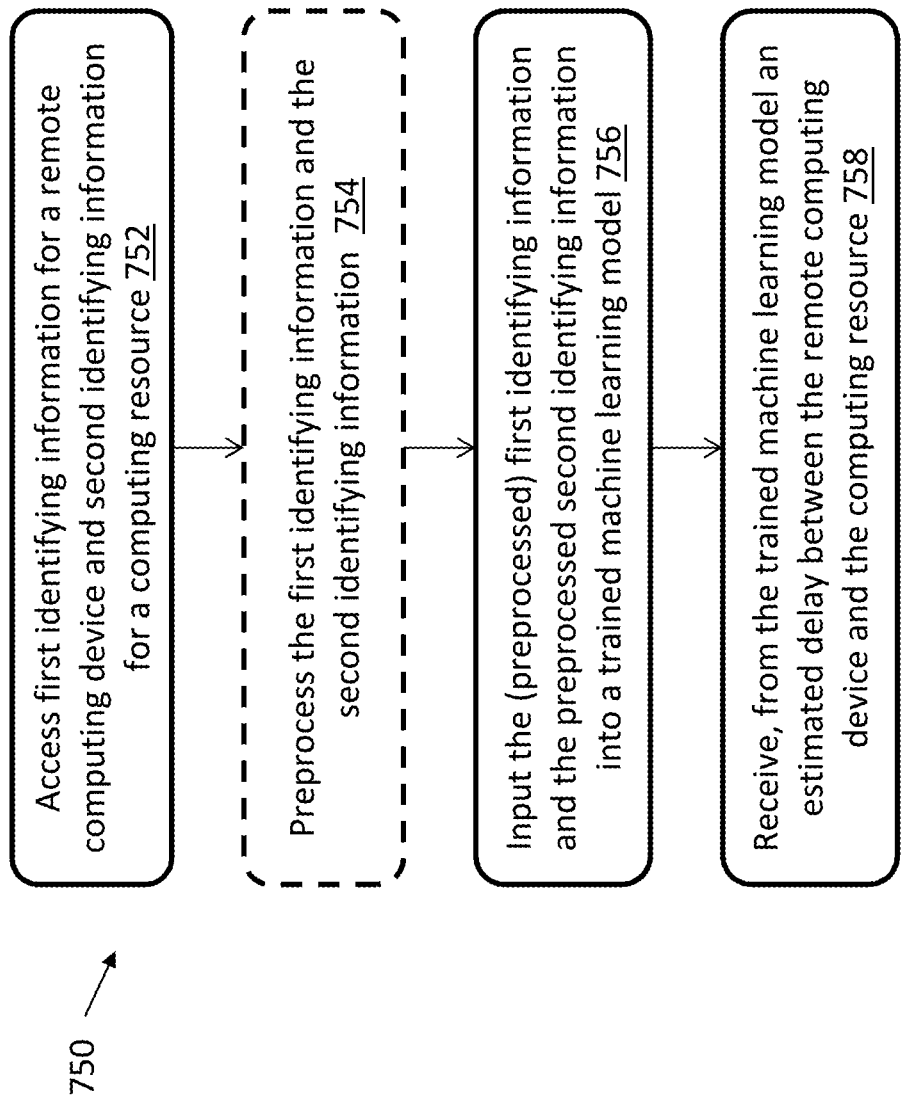
FIG. 7B shows an exemplary computerized method for performing AI-based delay estimation to determine an estimated delay, according to some embodiments.

FIG. 7A is a diagram showing an exemplary AI-based delay estimation system 700, according to some embodiments. The DEN 106 can, for example, execute the system 700 to compute estimated delays between a user and edge nodes in the network that can be used to service the user's request. FIG. 7B shows an exemplary computerized method 750 for performing AI-based delay estimation to determine an estimated delay, according to some embodiments. FIGS. 7A and 7B will be described together for illustrative purposes. At step 752, the system 700 accesses, as input, source identifying information 702 (e.g., for the requesting user) and destination identifying information 704 (e.g., for the computing resource). The system 700 includes an optional preprocessing module 706. At step 754, the system 700 optionally preprocesses the source and/or destination information 702 and 704 to generate processed data. At step 756, the (optionally preprocessed) source and destination information is then passed to the trained machine learning model 708. At step 758, the trained machine learning model 708 determines the estimated delay 710 between the source and the destination.

As can be seen by FIG. 7, the system 700 only requires the source and destination information 702, 704 to determine the estimated delay 710 between the source and destination, and therefore the system 700 does not require making any actual network delay measurements. The optional preprocessing performed by the preprocessing module 706 can include extracting identifying features (e.g., IP features), encoding (e.g., encoding non-numerical information), determining metrics between the source and destination devices (e.g., a distance), and/or the like. For example, features that can be extracted from the identifying information (e.g., IP addresses) can include a geographical location, an autonomous system, a domain name server (DNS) associated with the IP address, a virtual private network (VPN), a continent within which the device is located, a country within which the device is located, and/or the like, to generate extracted location features for the user device, the computing resource, and/or the like. As another example, some of the information (e.g., continent name, country name) can be non-numerical values, which can be encoded as numerical values for further processing. As a further example, the preprocessing can include computing a geographical distance between the source and destination devices.

According to some embodiments, the techniques include training the machine learning model using a data set that includes delay measurements. For example, one exemplary dataset that can be used to train the model is the KING dataset described in K. P. Gummadi, S. Saroiu, and S. D. Gribble, "King: Estimating latency between arbitrary Internet end hosts," in Proc. 2nd ACM SIGCOMM Workshop Internet Meas. (IMW), 2002, pp. 5-18, which is hereby incorporated by reference herein in its entirety. The KING dataset includes data from 1,740 Internet domain name system (DNS) servers. Pairwise RTTs were continuously measured at random intervals over a week to avoid congestion and to ensure link stabilization. The collected data set size is around 100 million pairwise RTTs in total.

Figure 9:
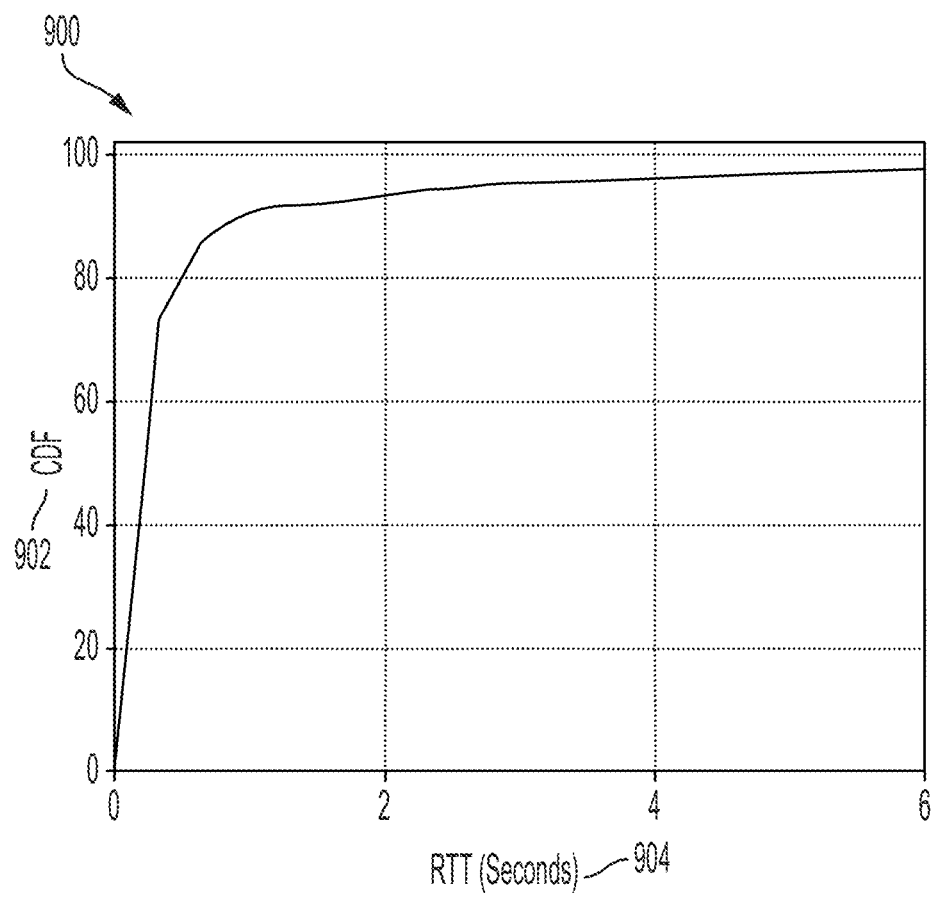
FIG. 9 is a graph showing the cumulative distribution function of the measured latencies in the KING dataset to the round-trip time, according to some embodiments.
Figure 10:
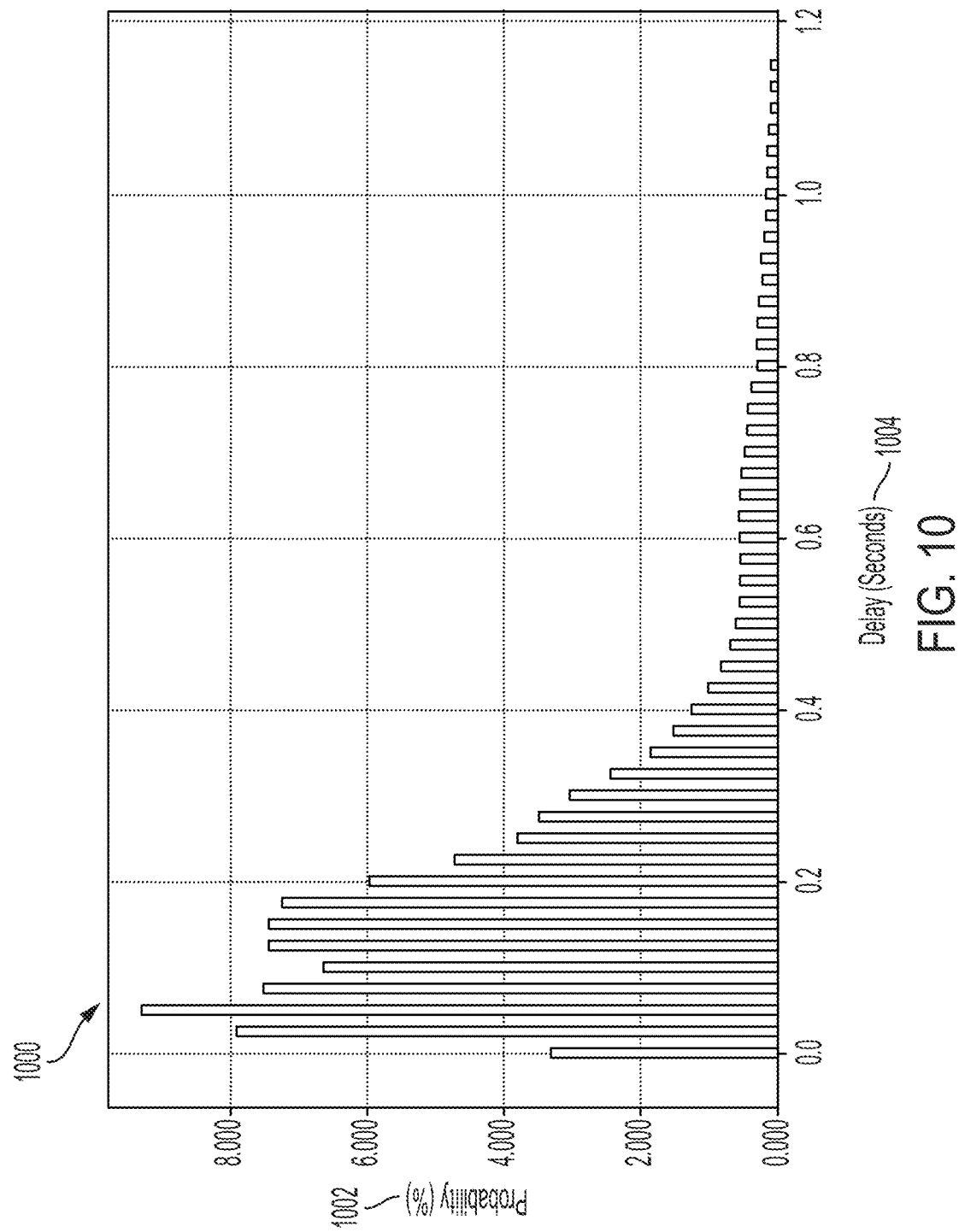
FIG. 10 is a graph that shows the probability mass function to the measured delays of the KING dataset, after eliminating the outliers, according to some embodiments.

According to some embodiments, the data can be preprocessed prior to training. For example, outlier data can be removed prior to training. As an illustrative example, some latencies in KING are over 3 seconds, which may mean that those nodes were unreachable at the time of measurement. However, those same nodes were typically reachable later with latency measurements much smaller than 3 seconds. As a result, such measurements of 3 seconds or more can be viewed as outliers and removed, which for the KING dataset example results in removing around 10% of the data set (with the remaining 90% of the data set having measurements under around 1 second). The averaged measured latency is 0.28 seconds. FIG. 9 is a graph 900 showing the cumulative distribution function (CDF) of the measured latencies in the KING dataset on the vertical axis 902 to the RTT (in seconds) on the horizontal axis 904, according to some embodiments. FIG. 10 is a graph 1000 that shows the probability mass function on the vertical axis 1002 to the measured delays (in seconds) on the horizontal axis 1004 of KING, after eliminating the outliers, according to some embodiments. As shown, the distribution does not have a single density. In addition, even after removing the outliers, the dataset has a long tail (e.g., from approximately 0.3 to just below 1.2 seconds), which can be challenging for DL algorithms (e.g., since DL algorithms consider such tails as additional data outliers that need to be either clipped or removed). However, such tail measurements in this dataset represent the actual delay measurements between different continents, i.e., two far nodes in the network. These measurements are, therefore, valid and should not be clipped or removed.

Figure 8:
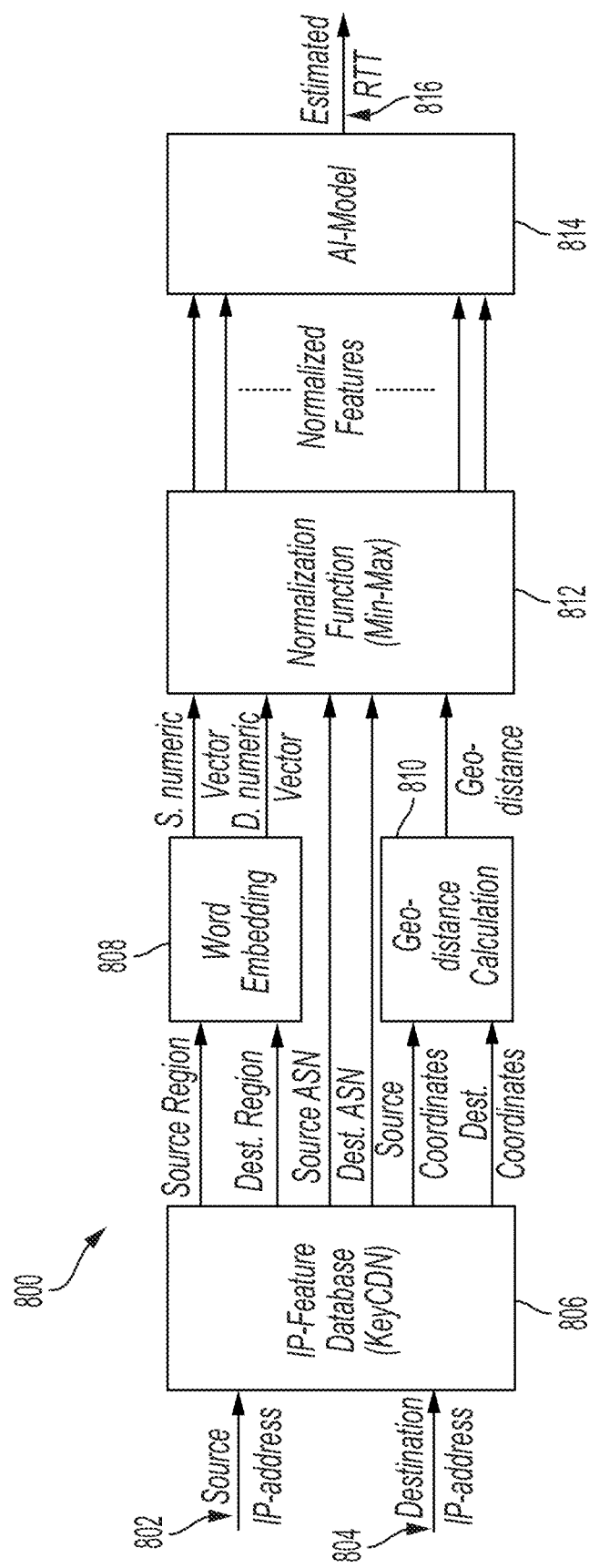
FIG. 8 is a detailed diagram of an exemplary an AI-based delay estimation system that uses IP addresses, according to some embodiments.

FIG. 8 is a detailed diagram of an exemplary an AI-based delay estimation system 800 that uses IP addresses, according to some embodiments. The system 800 receives as input a source IP address 802 (e.g., for the requesting user device) and a destination IP address 804 (e.g., for a candidate edge node). The system 800 includes components used for preprocessing the data, including an IP feature database 806 (e.g., such as a KeyCDN database and/or other database(s)), word embedding component 808, geo-distance calculation component 810, and normalization component 812. The system 800 also includes AI-based model 814, which receives as input the preprocessed data and determines an estimated round-trip time 816 between the source and destination devices.

Before training the AI model 814, the system 800 can apply data wrangling techniques to process the data for input to the AI model 814. According to some embodiments, the data wrangling techniques can be configured to enhance the performance of system 800 with a goal of obtaining the best possible latency estimation between the source and destination devices. Examples of the preprocessing are described further herein. After preprocessing the data (e.g., the KING data set), the data set can be split into training, validation and testing data sets. For example, the dataset can be split into three parts, and used for training (60%), validation (10%), and testing (30%).

Referring to IP feature database 806, the database can include information that can be extracted using the IP addresses to determine reliable data that can be used to train AI model 814. For example, while an IP address often represents a specific region or country, it may not reliable enough to be the main input to train AI model 814. For example, multibranch companies can assign their branches spread in different regions and countries with IP addresses from the same IP block. Therefore, IP addresses can be used to extract more reliable features such as geographical location, autonomous system, DNS, VPN, continent name, country name, and/or other information that can be extracted based on the IP addresses and/or other identifying information for the devices. According to some embodiments, system 800 may include an application programming interface (API) to communicate with the IP feature database(s). For example, system 800 can include an API to communicate with the KeyCDN service, which can provide such information as described in KeyCDN—Content Delivery Made Easy, available at https://www.keycdn.com/, which is hereby incorporated by reference herein in its entirety. It should be appreciated that KeyCDN is just an example of one such service that can be used to determine information for the source and destination devices. Other services can be used, including proprietary databases (e.g., databases developed by companies that provide voice over IP (VoIP) or online multiplayer gaming).

Referring to word embedding component 808, some of source and destination features (e.g., determined using the IP feature database 806) are nonnumeric, and therefore can be translated to numeric values prior to being fed to the AI-model 814. Word embedding can be used to encode nonnumeric features into unique vectors, such that each word keeps its correlation with other words. Word embedding is described in, for example, Y. Francillette, L. Abrouk, and A. Gouaich, "A players clustering method to enhance the players' experience in multi-player games," in Proc. 18$^{th}$ CGAMES, July 2013, pp. 229-234, which is hereby incorporated by reference herein in its entirety. An illustrative example is a country feature. The word "US" is more related to "CA" than to "UK," because both "US" and "CA" are located in North America, while "UK" is located in Europe. It can therefore be important to maintain this correlation. Therefore, word embedding component 808 can include three vectors for the three countries, such that the distance between the "US" vector and the "CA" vector is shorter than the distance to the "UK" vector. In this way, nonnumerical features can be translated to numeric features without losing such information and/or correlations.

According to some embodiments, the preprocessing can include synthetic featuring. A synthetic feature can be the result of mathematical operation(s) performed on one or more raw features, such as described in A. Gupta, A. Vedaldi, and A. Zisserman, "Synthetic data for text localisation in natural images," in Proc. IEEE Conf. Comput. Vis. Pattern Recognit. (CVPR), June 2016, pp. 2315-2324, and Feature Crosses-Machine Learning Crash Course by Google, available at https://developers.google.com/machine-learning/crash-course/feature-crosses/video-lecture, which are hereby incorporated by reference herein in their entirety. Synthetic features can provide higher level representations of the underlying raw data, since the features can condense information of the raw feature(s). Producing synthetic features (e.g., often by using (complicated) formulas) can help the AI-model 814 to correlate the features with the output. For example, instead of feeding directly redundant features such as the nodes' longitudes and latitudes to the model, a new synthetic feature "distance" can be constructed instead. According to some examples, the Haversine formula, described in E. Winarno, W. Hadikurniawati, and R. N. Rosso, "Location based service for presence system using haversine method," in Proc. Int. Conf. Innov. Creative Inf. Technol. (ICITech), November 2017, pp. 1-4 can be used, which is hereby incorporated by reference herein in its entirety. The Haversine formula is shown in the following Equation 3 for nodes 1 and 2 (e.g., source and destination):

$$d = 2r \cdot \arcsin\left(\sqrt{\sin^2\left(\frac{\phi_1 - \phi_2}{2}\right) + \cos(\phi_1)\cos(\phi_2)\sin^2\left(\frac{\lambda_1 - \lambda_2}{2}\right)}\right) \quad \text{Equation 3}$$

Where:
r is the earth's radius,
$\phi_x$ is the latitude of node x, and
$\lambda_x$ is the longitude of node X.

Referring to the normalization unit 812, the normalization unit performs feature normalization. For example, the input features can be normalized between certain values, such as between [0 and 1], between [−1 and 1], and/or the like. Such normalization can speed up the training phase of the AI model 814. The following exemplary Equation 4 shows a normalization function that can be used to put features between the values [0 and 1]:

$$\hat{x} = \frac{x - \min(F)}{\max(F) - \min(F)} \quad \text{Equation 4}$$

Where:
$\hat{x}$ is the normalized data point,
x is the data point before normalization, and
F is the feature data.

Referring to the AI model 814, according to some embodiments the techniques can use a convolutional neural network (CNN). A CNN may perform well (e.g., compared to other machine learning methods) because a CNN can extract complex and nonlinear patterns across the data set. A CNN can also help in dimensionality reduction, which can speed up the training phase. While some examples provided herein are described using a CNN, it should be appreciated that this is for exemplary purposes only, as other types of machine learning methods and models can be used without departing from the spirit of the techniques described herein.

Figure 11A:
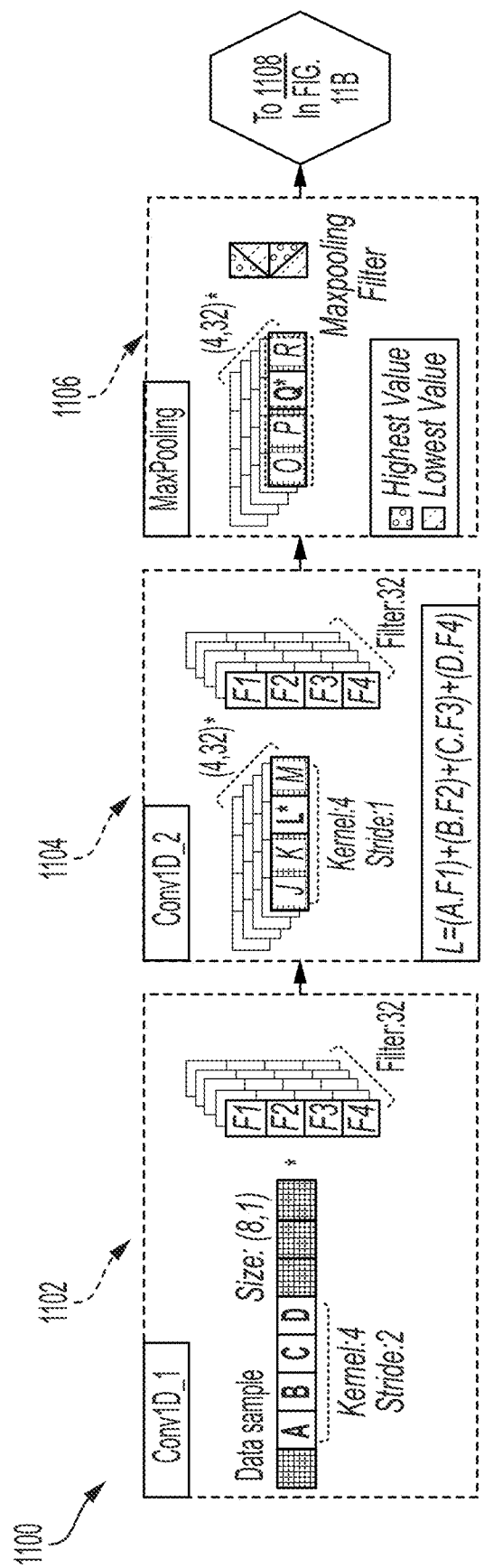
FIGS. 11A-11B show an exemplary convolutional neural network, according to some embodiments.
Figure 11B:
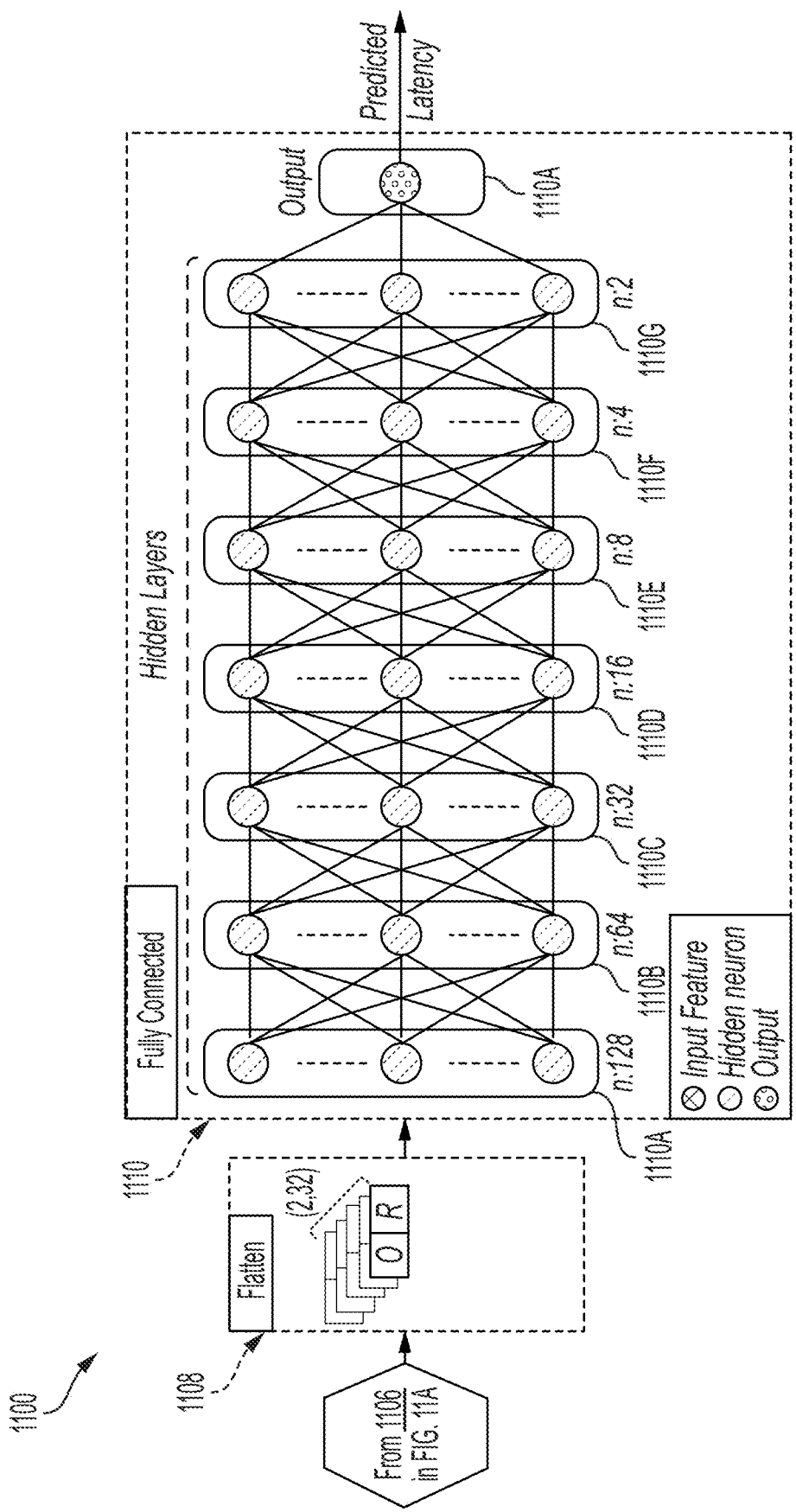

The CNN can have various components, including filtering, pooling, and/or the like. According to some embodiments, the CNN can be followed by fully connected layers that build correlation between the features selected by the CNN and the output. FIGS. 11A-11B show an exemplary CNN 1100, according to some embodiments. The CNN 1100 includes various components, including first filter layer 1102, second filter layer 1104, pooling layer 1106, flattening layer 1108, and a fully-connected portion 1110. The first filter layer 1102 and the second filter layer 1104 include weighted kernels that slide over the normalized data, creating an intermediate hidden layer. Then, pooling layer 1106 executes a pooling operation to reduce the CNN output's dimensionality. The pooling layer 1106 in this example chooses either the maximum or the average of values per pooling layer window, to create a set of nonoverlapping partitions over the normalized input.

Table 1 provides exemplary specifications for the layers of the CNN model 1100:

TABLE 1

| Layer Name | Configuration |
|---|---|
| Conv1D_1 1102 | Filter = 32, Kernel = 4, Strides = 2 |
| Conv1D_2 1104 | Filter = 32, Kernel = 4, Strides = 1 |
| MaxPooling 1106 | Chooses the highest number within the window |
| Flatten 1108 | Changes the data shape from 2D to 1D |
| Fully Connected 1110A, Hidden layer 1 | Neuron = 128, Relu. |
| Fully Connected 1110B, Hidden layer 2 | Neuron = 64, Relu. |
| Fully Connected 1110C, Hidden layer 3 | Neuron = 32, Relu. |
| Fully Connected 1110D, Hidden layer 4 | Neuron = 16, Relu. |
| Fully Connected 1110E, Hidden layer 5 | Neuron = 8, Relu. |
| Fully Connected 1110F, Hidden layer 6 | Neuron = 4, Relu. |
| Fully Connected 1110G, Hidden layer 7 | Neuron = 2, Relu. |
| Fully Connected 1110H, Output layer | Neuron = 1 |

According to some embodiments, the techniques can leverage a multimodal approach that uses multiple trained models to determine the estimated delay. For example, the techniques can use a first trained machine learning model (trained on a first type of data) to generate a first estimated delay, and a second trained machine learning model (trained on a second type of data that is different than the first data) to generate a second estimated delay. The overall delay can be generated based on the first and second estimated delays from the different models.

Figure 12:
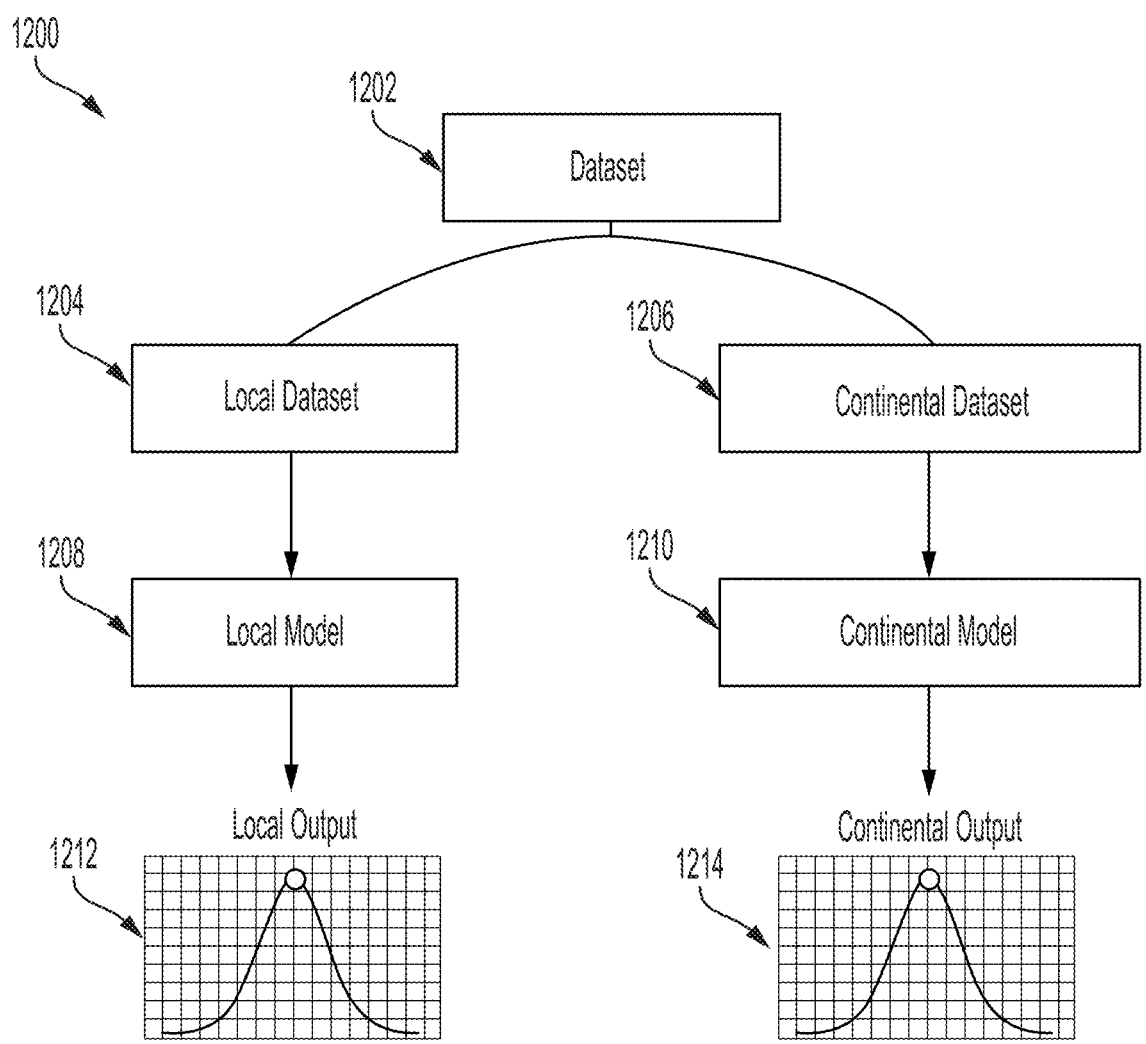
FIG. 12 is a diagram showing an exemplary training process for a multimodal deep learning network (MDN), according to some embodiments.

According to some embodiments, the AI-Model is a Multimodal DL Network (MDN), such as that described in L. De Vito, S. Rapuano, and L. Tomaciello, "One-way delay measurement: State of the art," IEEE Trans. Instrum. Meas., vol. 57, no. 12, pp. 2742-2750, December 2008, which is hereby incorporated by reference herein in its entirety. According to some embodiments, the techniques can include combining two (or more) neural networks. MDNs can be useful, for example, when there are different types of inputs, a dataset with a broad range of labels, and/or the like. Since the delays between nodes of different geographic regions is likely different, some embodiments can slice the data into different geographical regions. For example, the techniques can include slicing the data into local and remote data. The different slices can each be feed into a separate associated DL model. FIG. 12 is a diagram showing an exemplary training process 1200 for an MDN, according to some embodiments. The exemplary process 1200 slices the dataset 1202 (e.g., the KING dataset) into a local dataset 1204 and continental dataset 1206. The two subsets can be created according to the two nodes' locations for each training pair. The Continental dataset 1206 includes node pairs that are located in two different continents, while the local dataset 1204 includes node pairs that are located in the same continent. Each set is used for training an independent CNN model, leading to two models. The local dataset 1204 is fed into a first model to train a local model 1208, and the continental dataset 1206 is fed into a second model to train a continental model 1210. Each of these models 1208, 1210 therefore learns according to the data slice it is trained with, such that model 1208 generates local output 1212 and model 1210 generates continental output 1214.

It should be appreciated that the local and continental datasets 1204, 1206 are intended to be exemplary and not limiting. For example, different slices and/or more slices can be used, as desired, including those not based on same/different continents. As another example, more granular slices can be used. For example, the local dataset 1204 can be further divided into five different subsets to represent the five continents.

Figure 13:
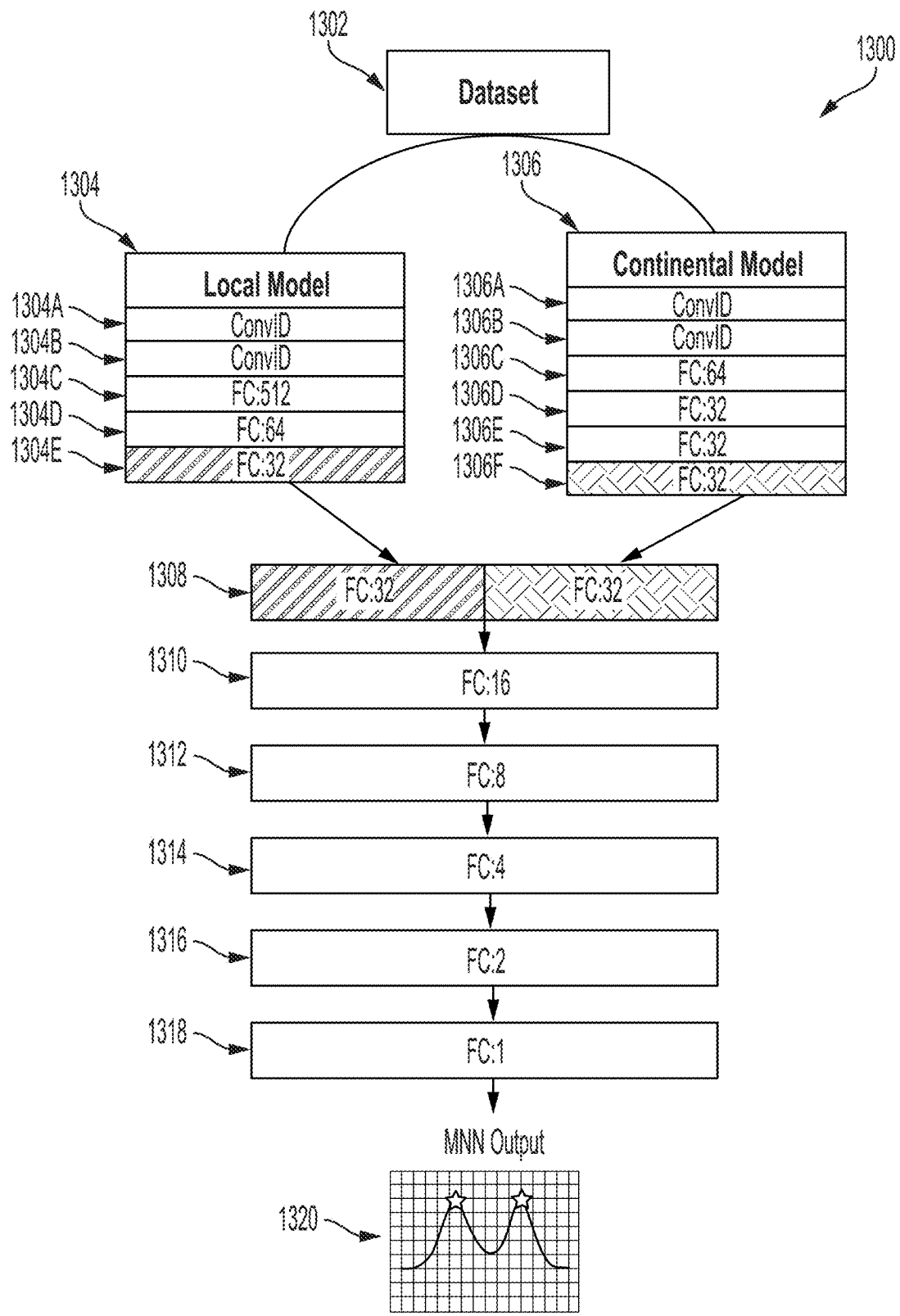
FIG. 13 is a diagram of an exemplary detailed MDN with concatenated output, according to some embodiments.

According to some embodiments, after the training process, the final model can be generated based on the trained models. For example, one or more layers can be removed (e.g., by trial and error to get the best result). The trained models can be treated as constants, frozen, and their outputs can be concatenated. The concatenated outputs can be followed by fully connected layers to generate the final output. As described herein, the above training may only be done once to create the final model. FIG. 13 is a diagram of an exemplary detailed MDN 1300 with concatenated output, according to some embodiments. As described in conjunction with FIG. 12, the dataset 1302 is sliced and used to train local model 1304 and continental model 1306. The local model 1304 includes five layers, namely the Conv1D layer 1304A, Conv1D layer 1304B, FC:512 layer 1304C, FC:64 layer 1304D, and FC:32 layer 1304E. The continental model 1306 includes six layers, namely the Conv1D layer 1306A, Conv1D layer 1306B, FC:64 layer 1306C, FC:32 layer 1306D, and FC:32 layer 1306E, and FC:32 layer 1306F.

As also shown in FIG. 13, the outputs of the local and continental models 1304, 1306 are concatenated using several fully connected layers to produce the required output using six layers, including FC:32 layer 1308, FC:16 layer 1310, FC:8 layer 1312, FC:4 layer 1314, FC:2 layer 1316, and FC:1 layer 1318, which ultimately produces the output 1320. The specifications of the two local and continental CNN models 1304, 1306 are presented in Table II before clipping and concatenation (while FIG. 13 shows the final multi-modal model, after freezing the weights, clipping the layers, concatenating the two models, and adding extra fully-connected layers):

TABLE II

| Layer Name | Configuration |
|---|---|
| *Local Model* | |
| Conv1D | Filter = 32, Kernel = 4, Strides = 2 |
| Conv1D | Filter = 32, Kernel = 4, Strides = 1 |
| MaxPooling | Chooses the highest number within the window |
| Flatten | Changes the data shape from 2D to 1D |
| Hidden layer 1 | Neuron = 512, Relu. |
| Hidden layer 2 | Neuron = 64, Relu. |
| Hidden layer 3 | Neuron = 32, Relu. |
| Hidden layer 4 | Neuron = 32, Relu. |
| Hidden layer 5 | Neuron = 16, Relu. |
| Hidden layer 6 | Neuron = 5, Relu. |
| Hidden layer 7 | Neuron = 2, Relu. |
| Output layer | Neuron = 1 |
| *Continental Model* | |
| Conv1D | Filter = 32, Kernel = 4, Strides = 2 |
| MaxPooling | Chooses the highest number within the window |
| Conv1D | Filter = 32, Kernel = 4, Strides = 1 |
| MaxPooling | Chooses the highest number within the window |
| Flatten | Changes the data shape from 2D to 1D |
| Hidden layer 1 | Neuron = 64, Relu. |
| Hidden layer 2 | Neuron = 32, Relu. |
| Hidden layer 3 | Neuron = 32, Relu. |
| Hidden layer 4 | Neuron = 8, Relu. |
| Hidden layer 5 | Neuron = 4, Relu. |
| Hidden layer 6 | Neuron = 2, Relu. |
| Output layer | Neuron = 1 |

Experiments were performed for the techniques described herein to compare the performance to conventional techniques. An exemplary MDN model was built using the techniques described herein (including with the layers described in FIG. 13 and Table II, and training using the KING dataset sliced into local and continental slices, as described herein).

The experiments also included training a CNN model that did not split the dataset into local and remote datasets, as done for MDN. The CNN model was built according to S. A. Mohammed, S. Shirmohammadi, and S. Altamimi, "Artificial intelligence-based distributed network latency measurement," in Proc. IEEE Int. Instrum. Meas. Technol. Conf. (I2MTC), May 2019, which is hereby incorporated by reference herein in its entirety. Table III below shows the performance comparison between the MDN model and the CNN model in terms of root-mean-square error (RMSE).

TABLE III

| MDN Model | | | CNN Model | | |
|---|---|---|---|---|---|
| Training | Validation | Testing | Training | Validation | Testing |
| 0.050 | 0.050 | 0.053 | 0.0705 | 0.0715 | 0.0731 |

Table III shows that the RMSE values for training, validation and testing for the MDN model were lower than those for the CNN model, and therefore the MDN model outperformed the conventional CNN model.

The experiments also compared the MDN model with other conventional algorithms, namely Vivaldi (e.g., described in F. Dabek, R. Cox, F. Kaashoek, and R. Morris, "Vivaldi: A decentralized network coordinate system," in Proc. ACM SIGCOMM CCR, 2004, pp. 15-26, which is hereby incorporated by reference herein in its entirety), DMF (e.g., as described in Y. Liao, P. Geurts, and G. Leduc, "Network distance prediction based on decentralized matrix factorization," in Proc. ICRN. Springer, 2010, pp. 15-26, which is hereby incorporated by reference herein in its entirety), IDES (e.g., which is described in Y. Mao, L. Saul, and J. Smith, "IDES: An Internet distance estimation service for large networks," IEEE J. Sel. Areas Commun., vol. 24, no. 12, pp. 2273-2284, December 2006, which is hereby incorporated by reference herein in its entirety), and Phoenix (e.g., which is described in Y. Chen et al., "Phoenix: A weight-based network coordinate system using matrix factorization," IEEE Trans. Netw. Service Manage., vol. 8, no. 4, pp. 334-347, December 2011, which is hereby incorporated by reference herein in its entirety), in addition to the CNN model.

Figure 14:
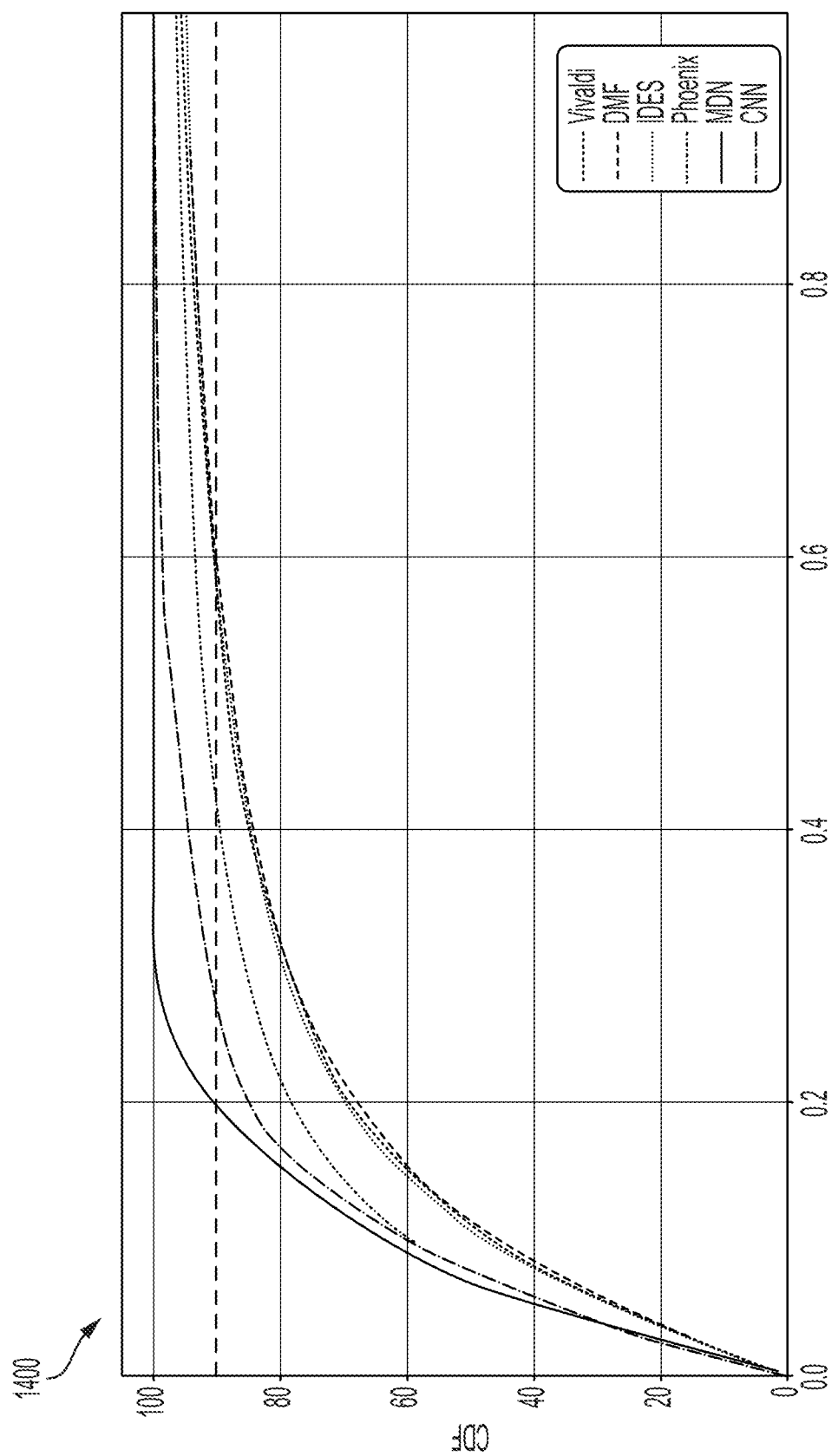
FIG. 14 is a chart showing the cumulative distribution function of the relative error of a set of tested models, according to some embodiments.

FIG. 14 is a chart 1400 showing the cumulative distribution function (CDF) of the Relative Error (RE) of the tested models, according to some embodiments. As shown by FIG. 14, the MDN model outperformed all of the other models (Vivaldi, DMF, IDES, Phoenix, and CNN). The $90^{th}$ Percentile of Relative Error (NPRE) is one metric that can be used to evaluate prediction algorithms (for this case, to evaluate the estimated delay performance). NPRE=[X], where X is a numerical value, means that 90% of the RE measurements are below X. NPRE of the MDN model was measured to be 0.25, which was the best of the models, while Phoenix was a distant second at 0.43.

Figure 15:
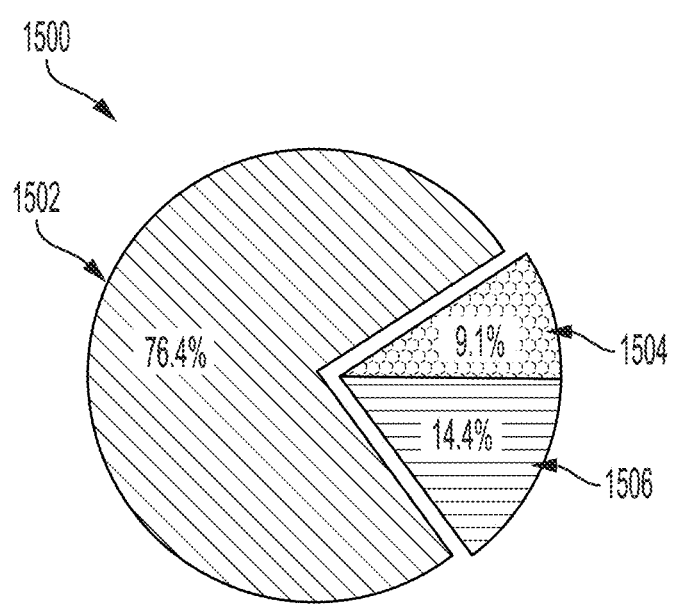
FIG. 15 is a pie chart showing the latency distribution of the data set based on the ratio between the predicted and measured latencies (predicted/measured) for MDN, according to some embodiments.

FIG. 15 is a pie chart 1500 showing the latency distribution of the data set based on the ratio between the predicted and measured latencies (predicted/measured) for MDN, according to some embodiments. A ratio of less than 1 means underestimated latency, while a ratio of more than 1 means overestimated latency. For MDN, 76.4% of the ratios were between 0.8 and 1.2 as shown by region 1502. Therefore, approximately three-quarters of the estimated latencies are within an estimation error of 20%. As shown by region 1504, 9.1% of the ratios are considered underestimated latencies by more than 20%, while 14.4%, as shown by region 1506, overestimated latencies by more than 20%.

Since NPRE can (sometimes strongly) depend on the data set, it can be desirable to use other metrics in addition to NPRE, which may not be the best indicator of accuracy on its own. The experiments therefore also used the average accuracy, in addition to NPRE, as a visualizable latency estimation metric, as computed using Equation 5 below:

$$\text{Average Accuracy} = \frac{\sum_{n=1}^{N} |1 - RE_n|}{N}$$

Where:
RE is relative error, and
N is the number of data points.

Table IV shows the results of this comparison. As shown by Table IV, the accuracy of MDN and CNN is 96.1% and 94.7%, respectively, while Phoenix has the highest accuracy among the other algorithms at 93.5%. These experiments therefore help confirm that the MDN's multimodal architecture performs better than the CNN's unimodal architecture.

TABLE IV

| Model | Accuracy |
|---|---|
| MDN | 96.1% |
| CNN | 94.7% |
| Vivaldi | 90.6% |
| IDES | 92.3% |
| DMF | 92.8% |
| Phoenix | 93.5% |

Figure 16:
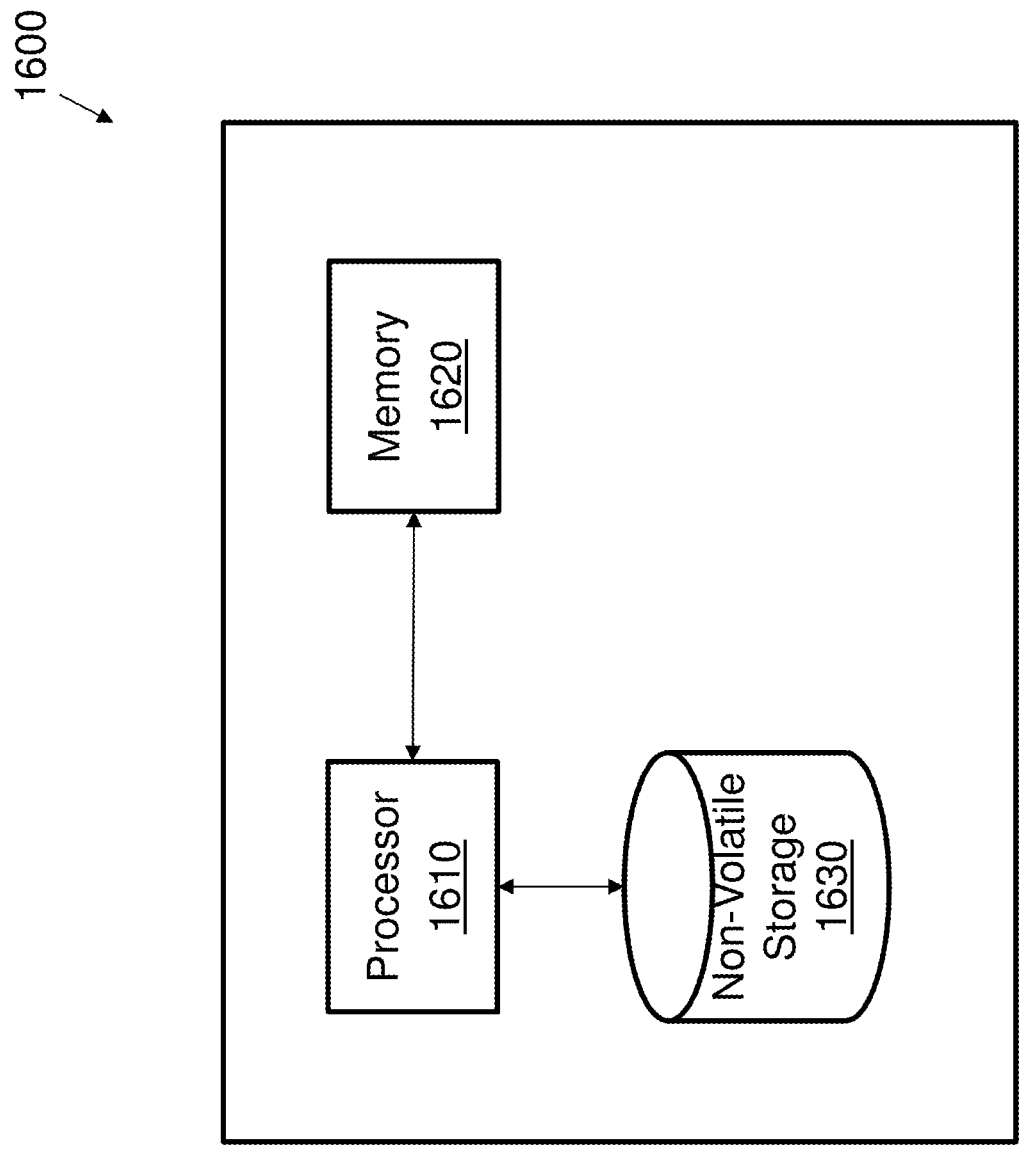
FIG. 16 is an illustrative implementation of a computer system that may be used to perform any of the aspects of the techniques and embodiments.

An illustrative implementation of a computer system 1600 that may be used to perform any of the aspects of the techniques and embodiments disclosed herein is shown in FIG. 16. Examples of the computer system 1600 can include, but are not limited to, a single server computer, a series of server computers, a single personal computer, a series of personal computers, a mini computer, a mainframe computer, and/or a computing cloud.

The computer system 1600 may include one or more processors 1610 and one or more non-transitory computer-readable storage media (e.g., memory 1620 and one or more non-volatile storage media 1630). The memory can include, but is not limited to, a hard disk drive; a flash drive, a tape drive; an optical drive; a RAID array; a random access memory (RAM); and a read-only memory (ROM). The processor 1610 may control writing data to and reading data from the memory 1620 and the non-volatile storage device 1630 in any suitable manner, as the aspects of the invention described herein are not limited in this respect. To perform functionality and/or techniques described herein, the processor 1610 may execute one or more instructions stored in one or more computer-readable storage media (e.g., the memory 1620, storage media, etc.), which may serve as non-transitory computer-readable storage media storing instructions for execution by the processor 1610.

In connection with techniques described herein, code used to implement the techniques described herein for may be stored on one or more computer-readable storage media of computer system 1600. Processor 1610 may execute any such code to provide any techniques for managing devices as described herein. Any other software, programs or instructions described herein may also be stored and executed by computer system 1600. It will be appreciated that computer code may be applied to any aspects of methods and techniques described herein. The various components of the computer system 1600 can execute one or more operating systems, examples of which can include but are not limited to: Microsoft Windows Server™; Novell Netware™; Redhat Linux™, Unix, and/or a custom operating system. For example, computer code may be applied to interact with an operating system to preform the techniques described herein through conventional operating system processes.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A computerized method for selecting a computing resource from a plurality of computing resources to perform a computing process, the method comprising:
   receiving, from a first remote computing device, first data indicative of a request to perform the computing process;
   accessing second data indicative of a first set of estimated metrics comprising, for each computing resource of the plurality of computing resources, a first estimated metric between the first remote computing device and the computing resource, wherein:
      the first estimated metric comprises an estimated delay between the first remote computing device and the computing resource or an estimated distance between the first remote computing device and the computing resource; and
      the first estimated metric is computed using a trained machine learning model that takes as input identifying information for the first remote computing device and the computing resource to determine the first estimated metric; and
   processing the second data using a machine learning algorithm to select a candidate computing resource from the plurality of computing resources to perform the process, wherein:
      the machine learning algorithm selects the candidate computing resource based on:

a second estimated metric between at least one second remote computing device and an associated computing resource from the plurality of computing resources performing a second computing process for the at least one second remote computing device; and
a capacity of each computing resource of the plurality of computing resources; and
processing the second data using the machine learning algorithm comprises processing the second data using a q-learning algorithm, comprising:
executing, for at least a subset of the plurality of computing resources, a reward function to determine a reward value for each computing resource of the subset of computing resources, comprising computing, based on the reward function, data indicative of a quality for each computing resource of the subset of computing resources; and
selecting the candidate computing resource from the subset of computing resources based on the determined reward values.

2. The method of claim 1, further comprising determining the subset of computing resources by eliminating any computing resources of the plurality of computing resources without capacity to perform the computing process from consideration by the reinforcement learning algorithm.

3. The method of claim 1, wherein:
the first set of estimated metrics comprise a first set of estimated distances;
the second estimated metric comprises a second estimated distance; and
selecting the candidate computing resource based on the second estimated metric between the at least one second remote computing device and the associated computing resource comprises:
selecting the candidate computing resource by determining (a) a first estimated distance between the remote computing device and the candidate computing resource is less than (b) a second estimated distance between the at least one second remote computing device and the associated computing resource.

4. The method of claim 1, wherein:
the first set of estimated metrics comprise a first set of estimated delays;
the second estimated metric comprises a second estimated delay; and
selecting the candidate computing resource based on the second estimated metric between the at least one second remote computing device and the associated computing resource comprises:
selecting the candidate computing resource by determining (a) a first estimated delay between the remote computing device and the candidate computing resource is less than (b) a second estimated delay between the at least one second remote computing device and the associated computing resource.

5. The method of claim 1, wherein processing the second data using the machine learning algorithm comprises:
processing the second data using a plurality of machine learning algorithms to generate a plurality of sets of reward values for the plurality of computing resources; and
analyzing the sets of reward values to select the candidate computing resource.

6. The method of claim 5, wherein selecting the candidate computing resource from the subset of computing resources based on the determined reward values comprises determining the candidate computing resource has a highest reward value among the sets of reward values.

7. The method of claim 5, wherein selecting the candidate computing resource from the subset of computing resources based on the determined reward values comprises:
normalizing the sets of reward values to generate normalized sets of reward values; and
determining the candidate computing resource has a highest reward value among the normalized sets of reward values.

8. The method of claim 1, wherein accessing the second data indicative of the first set of estimated metrics comprises:
computing, for each computing resource of the plurality of computing resources, a first estimated delay between the remote computing device and the computing resource by executing the trained machine learning model, comprising:
inputting first identifying information for the remote computing device and second identifying information for the computing resource to the trained machine learning model; and
receiving, from the trained machine learning model, the first estimated delay.

9. The method of claim 8, wherein:
inputting the first identifying information comprises inputting a first IP address for the remote computing device;
inputting the second identifying information comprises inputting a second IP address for the computing resource; and
receiving the first estimated delay comprises receiving, from the trained machine learning model, an estimated round trip time between the remote computing device and the computing resource.

10. The method of claim 9, wherein inputting the first and second IP addresses comprises:
extracting, for each of the first IP address and the second IP address, one or more of:
a geographical location;
an autonomous system;
a domain name server;
a virtual private network;
a continent name; and
a country name,
to generate first extracted location features for the remote computing device and second extracted location features for the computing resource.

11. The method of claim 10, further comprising encoding (a) one or more features of the first extracted location features and (b) one or more features of the second extracted location features from a non-numerical value to a numerical value.

12. The method of claim 10, further comprising:
computing, based on (a) one or more features of the first extracted location features and (b) the second extracted location features, a geographical distance between the remote computing device and the computing resource.

13. The method of claim 8, wherein executing the trained machine learning model comprises:
executing a first trained machine learning model to generate a third estimated metric, wherein the first trained machine learning model was trained on local delay data;

executing a second trained machine learning model to generate a fourth estimated metric, wherein the second trained machine learning model was trained on continental delay data; and generating the first estimated metric based on the third estimated metric and the fourth estimated metric.

14. The method of claim 1, wherein:

the first set of estimated metrics comprise a first set of estimated delays; and the second estimated metric comprises a second estimated delay.

15. The method of claim 1, wherein:

the first set of estimated metrics comprise a first set of estimated distances; and the second estimated metric comprises a second estimated distance.

16. A non-transitory computer-readable media comprising instructions that, when executed by one or more processors on a computing device, are operable to cause the one or more processors to select a computing resource from a plurality of computing resources to perform a computing process, comprising:

receiving, from a first remote computing device, first data indicative of a request to perform the computing process;

accessing second data indicative of a first set of estimated metrics comprising, for each computing resource of the plurality of computing resources, a first estimated metric between the first remote computing device and the computing resource, wherein:

the first estimated metric comprises an estimated delay between the first remote computing device and the computing resource or an estimated distance between the first remote computing device and the computing resource; and the first estimated metric is computed using a trained machine learning model that takes as input identifying information for the first remote computing device and the computing resource to determine the first estimated metric; and processing the second data using a machine learning algorithm to select a candidate computing resource from the plurality of computing resources to perform the process, wherein:

the machine learning algorithm selects the candidate computing resource based on:

a second estimated metric between at least one second remote computing device and an associated computing resource from the plurality of computing resources performing a second computing process for the at least one second remote computing device; and a capacity of each computing resource of the plurality of computing resources; and processing the second data using the machine learning algorithm comprises processing the second data using a q-learning algorithm, comprising:

executing, for at least a subset of the plurality of computing resources, a reward function to determine a reward value for each computing resource of the subset of computing resources, comprising computing, based on the reward function, data indicative of a quality for each computing resource of the subset of computing resources; and selecting the candidate computing resource from the subset of computing resources based on the determined reward values.

17. A system comprising a memory storing instructions, and a processor configured to execute the instructions to select a computing resource from a plurality of computing resources to perform a computing process by performing:

receiving, from a first remote computing device, first data indicative of a request to perform the computing process;

accessing second data indicative of a first set of estimated metrics comprising, for each computing resource of the plurality of computing resources, a first estimated metric between the first remote computing device and the computing resource, wherein:

the first estimated metric comprises an estimated delay between the first remote computing device and the computing resource or an estimated distance between the first remote computing device and the computing resource; and the first estimated metric is computed using a trained machine learning model that takes as input identifying information for the first remote computing device and the computing resource to determine the first estimated metric; and processing the second data using a machine learning algorithm to select a candidate computing resource from the plurality of computing resources to perform the process, wherein:

the machine learning algorithm selects the candidate computing resource based on:

a second estimated metric between at least one second remote computing device and an associated computing resource from the plurality of computing resources performing a second computing process for the at least one second remote computing device; and a capacity of each computing resource of the plurality of computing resources; and processing the second data using the machine learning algorithm comprises processing the second data using a q-learning algorithm, comprising:

executing, for at least a subset of the plurality of computing resources, a reward function to determine a reward value for each computing resource of the subset of computing resources, comprising computing, based on the reward function, data indicative of a quality for each computing resource of the subset of computing resources; and selecting the candidate computing resource from the subset of computing resources based on the determined reward values.

* * * * *